(12) United States Patent
Mueller et al.

(10) Patent No.: US 10,189,946 B2
(45) Date of Patent: *Jan. 29, 2019

(54) PROCESS FOR PREPARING POLYAMINES

(71) Applicant: BASF SE, Ludwigshafen (DE)

(72) Inventors: Christoph Mueller, Mannheim (DE); Thomas Reissner, Mannheim (DE); Ansgar Gereon Altenhoff, Heidelberg (DE); Andreas Kunst, Ludwigshafen (DE); Christian Mueller, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/121,940

(22) PCT Filed: Dec. 12, 2014

(86) PCT No.: PCT/EP2014/077480
§ 371 (c)(1),
(2) Date: Aug. 26, 2016

(87) PCT Pub. No.: WO2015/128021
PCT Pub. Date: Sep. 3, 2015

(65) Prior Publication Data
US 2017/0066882 A1  Mar. 9, 2017

(30) Foreign Application Priority Data
Feb. 26, 2014  (EP) .................................. 14156697

(51) Int. Cl.
C08G 73/00 (2006.01)
C08G 73/02 (2006.01)

(52) U.S. Cl.
CPC ..... *C08G 73/0213* (2013.01); *C08G 73/0206* (2013.01)

(58) Field of Classification Search
CPC .... C09J 179/02; C08G 73/0206; C08G 73/02; C07C 209/60; C07C 211/13
See application file for complete search history.

(56) References Cited

U.S. PATENT DOCUMENTS

| 3,941,808 A | 3/1976 | Pratt |
| 4,136,830 A | 1/1979 | Manfroy et al. |

(Continued)

FOREIGN PATENT DOCUMENTS

| DE | 25 40 871 A1 | 3/1977 |
| DE | 26 05 212 A1 | 8/1977 |

(Continued)

OTHER PUBLICATIONS

U.S. Appl. No. 13/760,460, filed Feb. 6, 2013, US 2013/0231413 A1, Andreas Kunst, et al.

(Continued)

*Primary Examiner* — Shane Fang
(74) *Attorney, Agent, or Firm* — Oblon, McClelland, Maier & Neustadt, L.L.P.

(57) ABSTRACT

The present invention relates to a process for preparing polyamines having a mean molecular weight of ≥203 g/mol, in which the deviation from the mean molecular weight per ° C. of change in the reaction temperature is <19% of the mean molecular weight, by polycondensation of diamines in the liquid phase in the presence of heterogeneous catalysts based on transition metals of the eighth to eleventh transition groups of the Periodic Table of the Elements and hydrogen at temperatures of 100 to 250° C. and pressures in the range from 60 to 150 bar, to the polyamines obtainable by this process, and to the use of the polyamines.

7 Claims, 7 Drawing Sheets

(56) References Cited

U.S. PATENT DOCUMENTS

Figure 1:
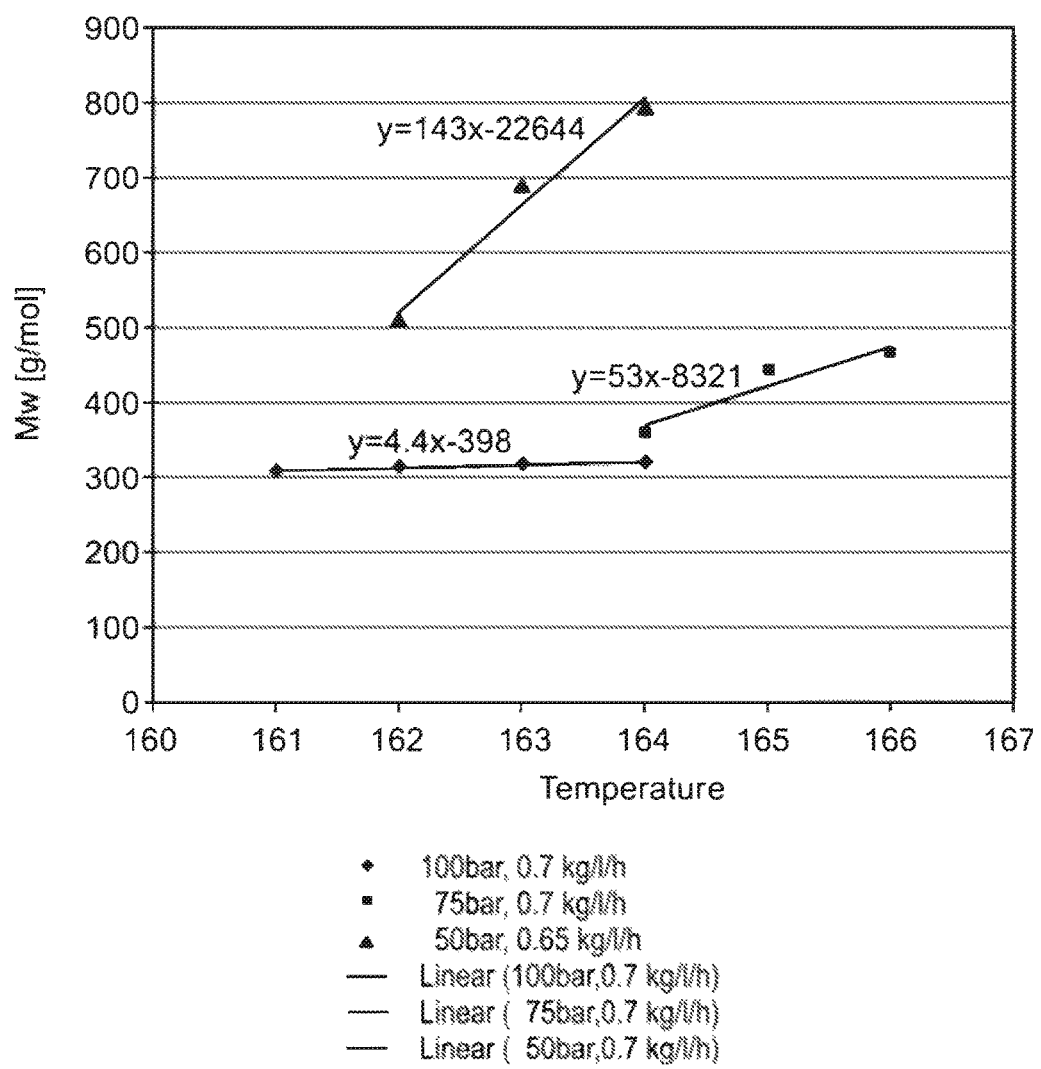

| | | | |
|---|---|---|---|
| 4,216,307 A | 8/1980 | Yuasa et al. | |
| 4,309,324 A | 1/1982 | Yuasa et al. | |
| 4,374,243 A | 2/1983 | Yuasa et al. | |
| 5,811,069 A | 9/1998 | Zertuche-Rodriguez et al. | |
| 8,987,518 B2 | 2/2014 | Altenhoff et al. | |
| 2004/0171884 A1 | 9/2004 | Lif et al. | |
| 2007/0100144 A1 | 5/2007 | Frauenkron et al. | |

FOREIGN PATENT DOCUMENTS

| | | |
|---|---|---|
| DE | 28 42 264 A1 | 4/1979 |
| DE | 103 35 991 A1 | 2/2005 |
| EP | 0 467 287 A2 | 1/1992 |
| EP | 0 779 342 A1 | 6/1997 |
| EP | 1 122 263 A1 | 8/2001 |
| EP | 1 515 994 A1 | 3/2005 |
| EP | 2 029 677 A1 | 3/2009 |
| EP | 2 125 234 A1 | 12/2009 |
| EP | 2 125 235 A1 | 12/2009 |
| EP | 2 129 468 A1 | 12/2009 |
| EP | 2 159 258 A1 | 3/2010 |
| EP | 2 390 208 A1 | 11/2011 |
| EP | 2 390 285 A1 | 11/2011 |
| EP | 2 510 059 A1 | 10/2012 |
| EP | 2 516 556 A1 | 10/2012 |
| WO | WO 02/49766 A2 | 6/2002 |
| WO | WO 03/010125 A1 | 2/2003 |
| WO | WO 2004/003029 A1 | 1/2004 |
| WO | WO 2007/138410 A1 | 12/2007 |
| WO | WO 2008/107786 A1 | 9/2008 |
| WO | WO 2008/107787 A1 | 9/2008 |
| WO | WO 2008/107790 A1 | 9/2008 |
| WO | WO 2011/070416 A1 | 6/2011 |
| WO | WO 2011/077232 A1 | 6/2011 |
| WO | WO 2014/131649 A1 | 9/2014 |

OTHER PUBLICATIONS

U.S. Appl. No. 61/723,790, filed Nov. 8, 2012, Christian Muller, et al.

U.S. Appl. No. 15/102,947, filed Jul. 25, 2016, Christoph Müller, et al.

U.S. Appl. No. 15/103,468, filed Aug. 16, 2016, Christoph Müller, et al.

U.S. Appl. No. 15/103,483, filed Jun. 10, 2016, Christoph Müller, et al.

U.S. Appl. No. 14/407,653, filed Dec. 12, 2014, US 2015/0230461 A1, Murat Mertoglu et al.

U.S. Appl. No. 14/763,203, filed Jul. 24, 2015, US 2015/0361381 A1, Sophia Ebert, et al.

U.S. Appl. No. 14/766,901, filed Aug. 10, 2015, US 2016/0002572 A1, Sophia Ebert, et al.

U.S. Appl. No. 14/771,681, filed Aug. 31, 2015, US 2016/0024344 A1, Christoph Müller, et al.

U.S. Appl. No. 14/765,149, filed Jul. 31, 2015, US 2015/0361379 A1, Stephan Hueffer, et al.

U.S. Appl. No. 15/120,028, filed Aug. 18, 2016, Christian Eidamshaus.

International Search Report dated Apr. 20, 2015 in PCT/EP2014/077480.

Search Report dated Aug. 7, 2014 in European Patent Application No. 14 15 6697.

PROCESS FOR PREPARING POLYAMINES

The present invention relates to a process for preparing polyamines having a mean molecular weight of ≥203 g/mol, in which the deviation from the mean molecular weight per ° C. of change in the reaction temperature is <19% of the mean molecular weight, by polycondensation of diamines in the liquid phase in the presence of heterogeneous catalysts based on transition metals of the eighth to eleventh transition groups of the Periodic Table of the Elements and hydrogen at temperatures of 100 to 250° C. and pressures in the range from 60 to 150 bar, to the polyamines obtainable by this process, and to the use of the polyamines.

Polymers having a defined mean molecular weight are very sought-after for preparation of different plastics, since the narrow, defined molecular weight thereof leads to novel, well-characterizable and/or -adjustable substance properties for the polymers prepared. Methods by which the mean molecular weight can be finely adjusted in a process are therefore of very great interest to the end user of the polymers, in order to vary selected properties of the polymers.

DE 2 439 275 discloses converting ethylenediamine in the presence of transition metals of the eighth to eleventh transition group of the Periodic Table of the Elements as catalysts to the ethylenediamine oligomers diethylenetriamine (DETA) and triethylenetetramine (TETA). Catalysts mentioned explicitly are catalysts comprising copper and nickel, or copper, nickel and cobalt. In general, for example, the following transition metals can be used effectively: Ni, Co, Pd, Ru, Pt. The conversion is effected at 100 to 150° C., preferably in the presence of hydrogen. The hydrogen pressure is variable within wide limits. It may be up to 250 bar. The conversion can be performed batchwise or continuously. Polyamines having a depleted low boiler content and a deviation from the desired mean molecular weight per ° C. of change of preferably <19% by weight are not described in DE 2 439 275.

DE 2 540 871 is a further configuration of DE 2 439 275. Rather than ethylenediamine, 1,3-propylenediamine is used and is converted to dipropylenetriamine and tripropylenetetramine under similar conditions to those used in DE 2 439 275. Operation is effected at 50 to 250° C., preferably 120 to 180° C., and at pressures of 1 to 500 bar, preferably 25 to 200 bar. The same catalyst as in DE 2 439 275 are claimed. In the two working examples, a catalyst comprising 4% by weight of Cu, 8% by weight of Co and 9% by weight of Ni is used. DE 2 540 871, however, does not describe a process by which polyamines having a depleted low boiler content, which have distinctly higher and narrow, defined mean molecular weights, can be prepared in a controlled manner.

WO 2006/082 203 A1 describes the continuous preparation of dipropylenetriamine by conversion of 1,3-propylenediamine over heterogeneous catalysts in a reaction column. WO 2006/082203, however, does not describe the preparation of polyamines. In addition, pressures in the range from 0 to 20 bar are employed.

WO 92/17 437 (BP Chemicals, priority 28 Mar. 1991) discloses the conversion of 1,6-hexamethylenediamine at 130 to 150° C. and standard pressure in the presence of Raney nickel. The main products obtained are dimers and trimers. No process for preparing polyamines is described in WO 92/17437.

The closest prior art is considered to be DE 2 605 212. It is stated here that the conversion of 1,2- or 1,3-propylenediamine can be conducted up to any conversion. Comparison of examples 1 and 2 shows that the conversion of the diamines to high boilers (polymers) rises with temperature. For instance, 1,3-propylenediamine at 160° C. and a hydrogen pressure of 50 bar in the presence of reduced cobalt oxide gives 72% by weight of polyamine (example 1), and at 180° C. and otherwise identical conditions gives more than 90% by weight of polyamine (example 2). Details of how polyamines having a narrow, defined mean molecular weight can be obtained are not described in DE 2 605 212.

DE 2 842 264 describes a process for preparing polyhexamethylenepolyamines by conversion of hexamethylenediamine in the presence of a palladium catalyst from the group of metallic palladium and palladium compounds. Operation is effected at 50 to 300° C., preferably 120 to 250° C. Hydrogen is not used in the inventive conversion. DE 2 842 264 states that the polymerization level can be controlled via the reaction conditions, such as reaction temperature, residence time or amount of catalyst. Thus, products having a low polymerization level are obtained when the amount of catalyst is high, and products having a high polymerization level when the amount of catalyst is low (page 19, second paragraph). Disadvantages of DE 2 842 264 are the long reaction times of up to 98 hours (example 13) and the high amounts of catalyst (example 1: reaction time 30 hours and 5.3 g palladium black, based on 116 g of hexamethylenediamine). The reaction time can be distinctly reduced by means of high temperatures (example 5: 0.5 hour at 220° C.). High temperatures, however, lead to increased formation of by-products (page 17, second paragraph).

The as yet unpublished application EP 13157314.9 describes a process for preparing polyamines by polycondensation over a fixed bed cobalt catalyst, in which the pressure is also kept constant around 50 bar, for which additional hydrogen or inert gas is injected, and the ammonia formed is removed from the process together with the gas. However, it is not stated here that even small temperature variations give rise to extreme deviations in the mean molecular weight established, nor that these temperature variations become unimportant with higher pressure in the polycondensation. Furthermore, it is not stated how low boilers can be depleted in a controlled manner.

It is therefore an object of the present invention to provide a process for preparing polyamines, in which even small temperature variations do not lead to any significant deviations in the molecular weight established, where the preparation of the polyamines does not require use of any great amounts of catalyst or complex apparatus measures in order to achieve a narrow, defined mean molecular weight and hence to be able to control the substance properties of the polyamine obtained, and where the low boilers therein (monomeric diamines and oligomers of the diamines) have been very substantially depleted.

Low boiler components are monomeric diamines and oligomers of diamines having a boiling point of <300° C., preferably <250° C., more preferably of <200° C., at 10 mbar. "Depleted" means concentrations of <5% by weight, preferably <1% by weight, more preferably <0.1% by weight, in the resultant product-of-value stream of the polyamines.

The low boilers (monomeric diamines and oligomers of the diamines) are very substantially depleted at pressures of 0.5 to 1000 mbar, preferably 0.5-500 mbar, more preferably 0.5-50 mbar, and temperatures of 150-300° C., preferably 165-265° C., more preferably 180-230° C., "very substantially depleted" meaning a low boiler content of <5% by weight, preferably <1% by weight, more preferably <0.1% by weight.

This object is achieved by a process for preparing polyamines having a mean molecular weight of ≥203 g/mol, in which the deviation from the mean molecular weight per ° C. of change in the reaction temperature is <19% of the mean molecular weight, by polycondensation of diamines in the liquid phase in the presence of hydrogen and catalysts based on metals of transition groups 8 to 11 of the Periodic Table of the Elements, by keeping the pressure constant during the polycondensation through continuous supply of inert gas and/or hydrogen and removing the inert gas and/or the hydrogen and the ammonia formed from the reactor during the reaction, which comprises performing the polycondensation at 100 to 250° C. and a pressure of 60 to 150 bar.

In the process according to the invention, the polyamines obtained preferably have a low boiler content of <5%.

In the process according to the invention, the polycondensation is preferably conducted at 130 to 180° C. and 75 to 200 bar.

In the process according to the invention, the gas used is preferably exclusively hydrogen.

In the process according to the invention, the diamines used are further preferably selected from the group of ethylenediamine, 1,3-propylenediamine, 1,2-propylenediamine, 1,4-butylenediamine, 1,2-butylenediamine, 1,5-diaminopentane, 1,2-diaminopentane, 1,5-diamino-2-methylpentane, 1,6-diaminohexane, 1,2-diaminohexane, 1,7-diaminoheptane, 1,2-diaminoheptane, 1,8-diaminooctane, 1,2-diaminooctane, 1,9-nonamethylenediamine, 1,10-decamethylenediamine, 1,2-diaminodecane, 1,11-undecamethylenediamine, 1,2-diaminoundecane, 1,12-dodecamethylenediamine, 1,2-diaminododecane, 2,2-dimethylenepropane-1,3-diamine, 4,7,10-trioxatridecane-1,3-diamine, 4,9-dioxydedecane-1,12-diamine, 3-(methylamino)propylamine and mixtures thereof.

Preference is given to the process according to the invention when the temperature is within the range from 150 to 180° C. and the pressure is in the range from 75 to 100 bar and the diamine used is 1,3-propanediamine.

In the process according to the invention, the catalysts used for the polycondensation are preferably those whose catalyst precursors comprise one or more oxides of the elements Cu, Co and/or Ni.

The invention further provides polyamines having a mean molecular weight of ≥203 g/mol, in which the deviation from the mean molecular weight per ° C. of change in the reaction temperature is <19% of the mean molecular weight, obtainable via the process according to the invention.

The invention further provides for the use of the inventive polyamines as or as a synthesis unit for a) an adhesion promoter, for example for printing inks for laminate films;
b) an auxiliary (adhesion), for example for production of multilayer composite films, with compatibilization not just of different polymer layers but also of metal foils;
c) an adhesion promoter for adhesives, for example in conjunction with polyvinyl alcohol, butyrate and acetate and styrene copolymers, or as a cohesion promoter for label adhesives;
d) a primer in coatings applications for improvement of adhesion on substrates such as glass, wood, plastic and metal;
e) a substance for improvement of wet adhesion, for example in standard emulsion paints, and for improvement of instantaneous rain resistance of paints, for example for road markings;
f) a complexing agent, especially with high binding capacity for heavy metals such as Hg, Pb, Cu, Ni;
g) a flocculant, for example in water treatment/water processing;
h) a penetration aid, for example for active metal salt formulations in wood protection;
i) a corrosion inhibitor, for example for iron and nonferrous metals and in the sectors of petroleum production and of secondary oil production;
j) a substance for immobilization of proteins and enzymes; microorganisms or as immobilizing the supports of enzymes and microorganisms;
k) a substance for blocking and sealing, for example mineral oil and natural gas industry;
l) a fixative, for example in the textile industry, especially as formaldehyde-free co-fixer;
m) an additive in the cosmetics sector, for example for hair-setting compositions and hair rinses;
n) an auxiliary in the papermaking industry, for example for acceleration of dewatering, elimination of contraries, neutralization of charge and paper coating as a multipurpose auxiliary;
o) a substance for separation of oil and water, for example in the metalworking industry;
p) an additive for landfill seals;
q) a flocculant;
r) a swimming pool algicide;
s) a substance for production of bitumen chemicals by reaction with fatty acids;
t) an antiswelling agent in order that clay absorbs water in a retarded manner;
u) an emulsifier or emulsion breaker;
v) a surfactant in the industrial cleaning (IC) and homecare, textile care and personal care sector;
w) a wood protector;
x) a substance for preparation of complexing agents (polycarboxylates);
y) a substance for production of auxiliaries for ore mining and mineral processing;
z) a dispersant for pigments, ceramic, carbon black, carbon, carbon fibers, metal powders;
aa) a substance for gas scrubbing as an absorbent of $CO_2$, $NO_x$, $SO_x$, $Cl_2$ and aldehydes and for neutralization of acidic constituents;
ab) a substance for water softening;
ac) a crystallization inhibitor;
ad) a rheology modifier (thickener);
ae) an auxiliary for the production and processing of oil, coal and natural gas;
af) a substance for production of synthetic rubber and rubber chemicals;
ag) an additive in coolants, lubricants and cooling lubricants;
ah) an auxiliary in the construction chemicals sector;
ai) a constituent of galvanizing baths;
aj) a substance for production of nonviral gene vectors;
ak) an epoxy hardener;
al) a formulating agent for plant protection compositions;
am) a crosslinker for conformance control and selective water shut-off measures in the oil and gas production sector;
an) a biocide for prevention and treatment of biofilms;
ao) a substance for production of flame retardants;
ap) a starter for polyols, as a crosslinker and scavenger of aldehydes in the polyurethanes sector or
aq) a substance for preparation of polyureas.

In the present invention, it has now been found that the polycondensation of diamines according to the prior art for preparation of polyamines is highly temperature-dependent. Small changes in the reaction temperature lead to large changes in the molecular weight. This is disadvantageous because this thermal sensitivity means that even small, typical temperature variations in the process lead to polyamines having very different properties (for example solid rather than liquid products).

In the processes described in the prior art, operation is generally effected at 40 to 50 bar. As can be seen in FIG. 1, even a temperature deviation by ±1° C. at 50 bar causes a deviation in the mean molecular weight to be established by about 140 g/mol, which corresponds to a 20% deviation from the mean target molecular weight of 700 g/mol to be established. If, in contrast, the reaction is conducted at 75 bar, FIG. 1 shows that the change in the mean molecular weight deviates only by 53 g/mol, which corresponds to an 11% deviation from the mean target molecular weight of 450 g/mol. If, in contrast, the reaction is conducted at 100 bar as shown in FIG. 1, the deviation is only slight and is <2% of the mean target molecular weight of 310 g/mol. FIG. 1 therefore demonstrates that a rise in the pressure leads to a reduction in the change in molecular weight as a result of variations in temperature. For this particular way of executing the process according to the invention, both the pressure and the temperature must therefore be optimized with respect to one another. It is therefore especially preferable, for preparation of polypropylenepolyamine, to select a pressure in the range from 75 to 100 bar and a temperature within the range of 150-180° C.

The starting compounds used are preferably diamines (also referred to hereinafter as "monomers").

Particular preference is given to using aliphatic alkylenediamines having 2 or more carbon atoms in the alkylene chain.

Particularly preferred aliphatic alkylenediamines can be described by formula I

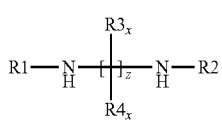

and the radicals are each defined as follows:
R1 and R2 are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which one $CH_2$ group has been replaced by O, NH or NR10;
$R3_x$ and $R4_x$ are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which one $CH_2$ group has been replaced by O, NH or NR10;
R10 is linear or branched $C_1$- to $C_{12}$-alkyl, $C_7$- to $C_{12}$-aralkyl, $C_6$- to $C_{10}$-aryl or $C_3$- to $C_6$-cycloalkyl;
z is a value from 2 to 20, preferably from 3 to 20;
and x is an index which can assume all values from 1 to z.

Preferably, R1, R2, $R3_x$ and $R4_x$ are each hydrogen and z is a value from 3 to 8.

Very particularly preferred aliphatic alkylenediamines are ethylenediamine, 1,3-propylenediamine, 1,2-propylenediamine, 1,4-butylenediamine, 1,2-butylenediamine, 1,5-diaminopentane, 1,2-diaminopentane, 1,5-diamino-2-methylpentane, 1,6-diaminohexane, 1,2-diaminohexane, 1,7-diaminoheptane, 1,2-diaminoheptane, 1,8-diaminooctane, 1,2-diaminooctane, 1,9-nonamethylenediamine, 1,10-decamethylenediamine, 1,2-diaminodecane, 1,11-undecamethylenediamine, 1,2-diaminoundecane, 1,12-dodecamethylenediamine, 1,2-diaminododecane, 2,2-dimethylpropane-1,3-diamine, 4,7,10-trioxatridecane-1,13-diamine, 4,9-dioxadodecane-1,12-diamine and 3-(methylamino)propylamine, or mixtures thereof.

The process is very especially preferable when ethylenediamine is used only in mixtures with the above aliphatic alkylenediamines. The process according to the invention is very especially preferable when the use of ethylenediamine as the sole diamine is excluded.

Further preferred diamines are oligomeric polyalkyleneamines of 2 to 5 amine units consist, or mixtures thereof.

Particularly preferred oligomeric polyalkyleneamines can be described by formula II

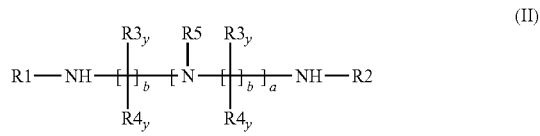

and the radicals are each defined as follows:
R1, R2, $R3_y$, $R4_y$ and R5 are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which one $CH_2$ group has been replaced by O, NH or NR10;
R10 is as defined above;
a) is a value from 2 to 5;
b) is a value from 2 to 12;
and y is an index which can assume all values between 1 and b.

Very particularly preferred polyalkyleneamines are N,N-bis(3-aminopropyl)methylamine, diethylenetriamine (DETA), triethylenetetramine (TETA), tetraethylenepentamine (TEPA), di-1,3-propylenetriamine, tri-1,3-propylenetetramine and tetra-1,3-propylenepentamine, di-1,2-propylenetriamine, tri-1,2-propylenetetramine and tetra-1,2-propylenepentamine, dihexamethylenetriamine, trihexamethylenetetramine and tetrahexamethylenepentamine.

Further preferred diamines are cyclic diamines in which the amino groups are joined either directly or indirectly to one or more mutually connected unsubstituted or substituted cycloaliphatic or heteroaliphatic, aromatic or heteroaromatic rings.

Particularly preferred cyclic diamines are alicyclic diamines.

Preferred alicyclic diamines are 3,3'-dimethyl-4,4'-diaminodicyclohexylmethane, 4,4'-diaminodicyclohexylmethane, isophoronediamine, bis(4-aminocyclohexyl)methane, bis(4-amino-3,5-dimethylcyclohexyl)methane or bis(4-amino-3-methylcyclohexyl)methane, 3-(cyclohexylamino)propylamine, bis(aminoethyl)piperazine and bis(aminomethyl)piperazine.

Particularly preferred aromatic cyclic diamines aromatic diamines in which the amino group is not substituted directly on the aromatic ring.

Preferred aromatic diamines are the isomeric bis(aminomethyl)benzenes, especially meta-xylenediamine (MXDA), or the isomeric bis(aminomethyl)benzenes, isomers of aminobenzylamine (2-aminobenzylamine, 4-aminobenzylamine), 4-(2-aminoethyl)aniline, m-xylylenediamine, o-xylylenediamine, or 2,2'-biphenyldiamines, or oxydianilines, for example 4,4'-oxydianiline, isomers of diaminofluorene, isomers of diaminophenanthrene and 4,4'-ethylenedianiline.

Further preferred diamines are polyetheramines of the formula III

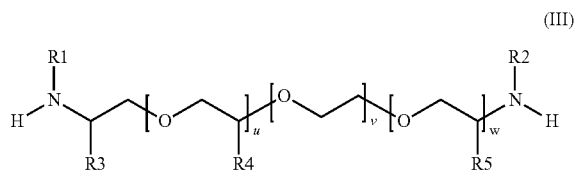

and the radicals are each defined as follows:
R1 and R2 are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which one $CH_2$ group has been replaced by O, NH or NR10;
R3, R4 and R5 are simultaneously or each independently hydrogen, linear or branched $C_1$- to $C_{12}$-alkyl, $C_7$- to $C_{12}$-aralkyl, $C_6$- to $C_{10}$-aryl, $C_3$- to $C_8$-cycloalkyl or $C_3$- to $C_8$-cycloalkyl in which one $CH_2$ group has been replaced by O, NH or NR10;
R10 is linear or branched $C_1$- to $C_{12}$-alkyl, $C_7$- to $C_{12}$-aralkyl, $C_6$- to $C_{10}$-aryl or $C_3$- to $C_8$-cycloalkyl;
u, v and w are each independently a value from 0 to 100.

Preferably, u and w each assume a value of 0 and v assumes a value >0, and the substituents R1 to R5 are preferably hydrogen (polyetheramines based on ethylene glycol).

Further preferably, v assumes a value of 0 and (u+w) a value of >0, and the substituents R1 and R2 are preferably hydrogen and the substituents R3 to R5 are preferably methyl (polyetheramines based on propylene glycol).

Further preferably, v assumes a value of >0 and (u+w) a value of >0, and the substituents R1 to R2 are preferably hydrogen and the substituents R3 to R5 are preferably methyl (block polyetheramines having a central block based on polyethylene glycol and outer blocks based on propylene glycol).

Very particularly preferred polyether diamines are 4,7,10-trioxatridecane-1,13-diamine, 4,9-dioxadodecane-1,12-diamine and what are called Jeffamines® from Huntsman, especially Jeffamine D230, Jeffamine D400, Jeffamine D2000, Jeffamine D4000, Jeffamine ED600, Jeffamine ED900, Jeffamine ED2003, Jeffamine EDR148 and Jeffamine EDR176 (names from the product brochure from Alfa Chemicals Ltd. with reference number "Hunt32").

It is possible with preference to use 80 mol % or more, more preferably 90 mol % or more, even more preferably 95 mol % or more and especially preferably 99 mol % or more of the abovementioned bifunctional monomers in the process.

Most preferably, aside from diamines, no further monomers are used in the process.

Catalysts

Catalysts used for the conversion of diamines to polyamines may especially be catalysts comprising one or more elements of transition group 8 of the periodic table (Fe, Co, Ni, Ru, Rh, Pd, Os, Ir, Pt), preferably Co, Ni, Ru, Cu or Pd, more preferably Co, Ni and/or Cu (also referred to hereinafter as catalytically active metals).

The abovementioned catalysts may be doped in a customary manner with promoters, for example with chromium, iron, cobalt, manganese, molybdenum, titanium, tin, metals of the alkali metal group, metals of the alkaline earth metal group and/or phosphorus.

The catalysts used may preferably be what are called skeletal catalysts (also referred to as Raney® type, hereinafter also: Raney catalysts), which are obtained by leaching out (activating) an alloy composed of catalyst, reactive metal and a further component (preferably Al). Preference is given to using Raney nickel catalysts or Raney cobalt catalysts.

Catalysts used are further preferably supported Pd or Pt catalysts. Preferred support materials are activated carbon, $Al_2O_3$, $TiO_2$, $ZrO_2$ and $SiO_2$.

Most preferably, catalysts which are prepared by reduction of what are called catalyst precursors are used in the process according to the invention.

The catalyst precursor comprises an active composition comprising one or more catalytically active components, optionally promoters and optionally a support material.

The catalytically active components are oxygen compounds of the abovementioned catalytically active metals, for example and the metal oxides or hydroxides thereof, such as CoO, NiO, CuO and/or mixed oxides thereof.

In the context of this application, the term "catalytically active components" is used for the abovementioned oxygen-containing metal compounds, but is not supposed to imply that these oxygen compounds are themselves already catalytically active. The catalytically active components generally have catalytic activity in the inventive conversion only after reduction.

Particular preference is given to catalyst precursors comprise one or more oxides of the elements Cu, Co and Ni, such as the oxide mixtures which are disclosed in EP-A-0636409 and which comprise, prior to reduction with hydrogen, 55 to 98% by weight of Co, calculated as CoO, 0.2 to 15% by weight of phosphorus, calculated as $H_3PO_4$, 0.2 to 15% by weight of manganese, calculated as $MnO_2$, and 0.2 to 15% by weight of alkali metal, calculated as $M_2O$ (M=alkali metal), or the oxide mixtures which are disclosed in EP-A-0742045 and which comprise, prior to reduction with hydrogen, 55 to 98% by weight of Co, calculated as CoO, 0.2 to 15% by weight of phosphorus, calculated as $H_3PO_4$, 0.2 to 15% by weight of manganese, calculated as $MnO_2$, and 0.05 to 5% by weight of alkali metal, calculated as $M_2O$ (M=alkali metal), or oxide mixtures which are disclosed in EP-A-696572 and which comprise, prior to reduction with hydrogen, 20 to 85% by weight of $ZrO_2$, 1 to 30% by weight of oxygen compounds of copper, calculated as CuO, 30 to 70% by weight of oxygen compounds of nickel, calculated as NiO, 0.1 to 5% by weight of oxygen compounds of molybdenum, calculated as $MoO_3$, and 0 to 10% by weight of oxygen compounds of aluminum and/or manganese, calculated as $Al_2O_3$ and $MnO_2$ respectively, for example the catalyst disclosed in loc. cit., page 8, with the composition of 31.5% by weight of $ZrO_2$, 50% by weight of NiO, 17% by weight of CuO and 1.5% by weight of $MoO_3$, or oxide mixtures which are disclosed in EP-A-963975 and which comprise, prior to reduction with hydrogen, 22 to 45% by weight of $ZrO_2$, 1 to 30% by weight of oxygen compounds of copper, calculated as CuO, 15 to 50% by weight of oxygen compounds of nickel, calculated as NiO, where the molar Ni:Cu ratio is greater than 1, 15 to 50% by weight of oxygen compounds of cobalt, calculated as CoO, 0 to 10% by weight of oxygen compounds of aluminum and/or manganese, calculated as $Al_2O_3$ and $MnO_2$ respectively, and no oxygen compounds of molybdenum, for example the catalyst A disclosed in loc. cit., page 17, with the composition of 33% by weight of Zr, calculated as $ZrO_2$, 28% by weight of Ni, calculated as NiO, 11% by weight of Cu, calculated as CuO and 28% by weight of Co, calculated as CoO.

In a very particularly preferred embodiment, 50 to 100 mol %, more preferably 60 to 99 mol % and most preferably 75 to 98 mol % of the catalytically active metals present in the catalytically active composition are one or more metals selected from the group consisting of Cu, Co and Ni.

Very especially preferable catalysts are unsupported cobalt catalysts as described in EP 0636409 and EP 0742045.

The molar ratio of the atoms of the components of the active composition relative to one another can be measured by means of known methods of elemental analysis, for example of atomic absorption spectrometry (AAS), of atomic emission spectrometry (AES), of X-ray fluorescence analysis (XFA) or of ICP-OES (Inductively Coupled Plasma Optical Emission Spectrometry). The molar ratio of the atoms of the components of the active composition relative to one another can also be determined by calculation, for example by determining the starting weights of the compounds used which comprise the components of the active composition and determining the proportions of the atoms in the components of the active composition on the basis of the known stoichiometry of the compounds used, such that it is possible to calculate the atomic ratio from the starting weights and the stoichiometric formula of the compound used. Of course, the stoichiometric formula of the compounds used can also be determined experimentally, for example by one or more of the abovementioned methods.

According to the process conducted (suspension polymerization, fluidized bed process, fixed bed polymerization), the catalysts are used in the form of powder, spall or shaped bodies (preferably extrudates or tablets).

The catalysts or catalyst precursors are preferably used in the form of shaped bodies in the process according to the invention.

Suitable shaped bodies are those having any geometry or shape. Preferred shapes are tablets, rings, cylinders, star extrudates, wagonwheels or spheres. Particular preference is given to tablets, rings, cylinders, spheres or star extrudates. Extrudate form is very particularly suitable.

Impregnation

In a preferred embodiment, the catalysts are used in the process according to the invention in the form of shaped bodies which are prepared by saturation (impregnation) of support materials which have the abovementioned geometry or which are shaped after impregnation to shaped bodies having the abovementioned geometry.

Useful support materials include, for example, carbon such as graphite, carbon black, graphene, carbon nanotubes and/or activated carbon, aluminum oxide (gamma, delta, theta, alpha, kappa, chi or mixtures thereof), silicon dioxide, zirconium dioxide, zeolites, aluminosilicates or mixtures thereof.

The abovementioned support materials can be impregnated by the customary processes (A. B. Stiles, Catalyst Manufacture—Laboratory and Commercial Preparations, Marcel Dekker, New York, 1983), for example by application of a metal salt solution in one or more impregnation stages. Useful metal salts generally include water-soluble metal salts such as the nitrates, acetates or chlorides of the corresponding catalytically active components or doping elements, such as cobalt nitrate or cobalt chloride. Thereafter, the impregnated support material is generally dried and optionally calcined.

Calcining is performed generally at temperatures between 300 and 800° C., preferably 350 to 600° C., especially at 450 to 550° C.

The impregnation can also be effected by the "incipient wetness method", in which the support material is moistened with the impregnation solution up to a maximum of saturation, according to its water absorption capacity. Alternatively, impregnation may take place in supernatant solution.

In the case of multistage impregnation processes, it is appropriate to dry and optionally to calcine between individual impregnation steps. Multistage impregnation should be employed advantageously when the support material is to be contacted with metal salts in a relatively large amount.

For the purpose of applying a plurality of metal components to the support material, impregnation may take place simultaneously with all of the metal salts, or in any desired order of the individual metal salts in succession.

Preference is given to using support materials which already have the above-described preferred geometry of the shaped bodies.

However, it is also possible to use support materials present in the form of powder or spall, and to subject impregnated support materials to shaping.

For example, the impregnated and dried or calcined support material can be conditioned.

The conditioning can be effected, for example, by adjusting the impregnated support material to a particular particle size by grinding.

After grinding, the conditioned, impregnated support material can be mixed with shaping aids such as graphite or stearic acid, and processed further to give shaped bodies.

Standard processes for shaping are described, for example, in Ullmann [Ullmann's Encyclopedia Electronic Release 2000, chapter: "Catalysis and Catalysts", pages 28-32] and by Ertl et al. [Ertl, Knözinger, Weitkamp, Handbook of Heterogeneous Catalysis, VCH Weinheim, 1997, pages 98 ff.].

Standard processes for shaping are, for example, extrusion, tableting, i.e. mechanical pressing, or pelletizing, i.e. compaction by circular and/or rotating movements.

The shaping operation can give shaped bodies with the abovementioned geometry.

The conditioning or shaping is generally followed by a heat treatment. The temperatures in the heat treatment typically correspond to the temperatures in the calcination.

Coprecipitation

In a further preferred embodiment, shaped bodies which are produced by coprecipitation of all the components thereof, the catalyst precursors thus precipitated being subjected to a shaping operation, are used in the process according to the invention.

For this purpose, a soluble compound of the corresponding active component, the doping elements and optionally a soluble compound of a support material in a liquid is admixed while heating and stirring with a precipitant until precipitation is complete.

The liquid used is generally water.

Useful soluble compounds of the active components typically include the corresponding metal salts, such as the nitrates, sulfates, acetates or chlorides, of the aforementioned metals.

The soluble compounds of a support material used are generally water-soluble compounds of Ti, Al, Zr, Si etc., for example the water-soluble nitrates, sulfates, acetates or chlorides of these elements.

The soluble compounds of the doping elements used are generally water-soluble compounds of the doping elements, for example the water-soluble nitrates, sulfates, acetates or chlorides of these elements.

Typically, in the precipitation reactions, the soluble compounds are precipitated as sparingly soluble or insoluble, basic salts by addition of a precipitant.

The precipitants used are preferably alkalis, especially mineral bases, such as alkali metal bases. Examples of precipitants are sodium carbonate, sodium hydroxide, potassium carbonate or potassium hydroxide.

The precipitants used may also be ammonium salts, for example ammonium halides, ammonium carbonate, ammonium hydroxide or ammonium carboxylates.

The precipitation reactions can be performed, for example, at temperatures of 20 to 100° C., particularly 30 to 90° C., especially at 50 to 70° C.

The precipitates obtained in the precipitation reactions are generally chemically inhomogeneous and generally comprise mixtures of the oxides, oxide hydrates, hydroxides, carbonates and/or hydrogencarbonates of the metals used. With regard to the filterability of the precipitates, it may prove to be favorable for them to be aged—meaning that they are left to themselves for a certain time after precipitation, optionally under hot conditions or with air being passed through.

The precipitates obtained by these precipitation processes are typically processed, by washing, drying, calcining and conditioning them.

After washing, the precipitates are generally dried at 80 to 200° C., preferably 100 to 150° C., and then calcined.

Calcining is performed generally at temperatures between 300 and 800° C., preferably 350 to 600° C., especially at 450 to 550° C.

After the calcination, the pulverulent catalyst precursors obtained by precipitation reactions are typically conditioned.

The conditioning can be effected, for example, by adjusting the precipitation catalyst to a particular particle size by grinding.

After grinding, the catalyst precursor obtained by precipitation reactions can be mixed with shaping assistants such as graphite or stearic acid and processed further to give shaped bodies.

Standard processes for shaping are described, for example, in Ullmann [Ullmann's Encyclopedia Electronic Release 2000, chapter: "Catalysis and Catalysts", pages 28-32] and by Ertl et al. [Ertl, Knözinger, Weitkamp, Handbook of Heterogeneous Catalysis, VCH Weinheim, 1997, pages 98 ff.].

Standard processes for shaping are, for example, extrusion, tableting, i.e. mechanical pressing, or pelletizing, i.e. compaction by circular and/or rotating movements.

The shaping operation can give shaped bodies with the abovementioned geometry.

The conditioning or shaping is generally followed by a heat treatment. The temperatures in the heat treatment typically correspond to the temperatures in the calcination.

Precipitative Application

In a further preferred embodiment, the shaped bodies can be produced by precipitative application.

Precipitative application is understood to mean a production method in which a sparingly soluble or insoluble support material is suspended in a liquid and then soluble compounds, such as soluble metal salts, of the corresponding metal oxides are added, and these are then applied by precipitation to the suspended support by addition of a precipitant (for example, described in EP-A2-1 106 600, page 4, and A. B. Stiles, Catalyst Manufacture, Marcel Dekker, Inc., 1983, page 15).

Useful sparingly soluble or insoluble support materials include, for example, carbon compounds such as graphite, carbon black and/or activated carbon, aluminum oxide (gamma, delta, theta, alpha, kappa, chi or mixtures thereof), silicon dioxide, zirconium dioxide, zeolites, aluminosilicates or mixtures thereof.

The support material is generally in the form of powder or spall.

The liquid used, in which the support material is suspended, is typically water.

Useful soluble compounds include the aforementioned soluble compounds of the active components or of the doping elements.

The precipitation reactions can be performed, for example, at temperatures of 20 to 100° C., particularly 30 to 90° C., especially at 50 to 70° C.

The precipitates obtained in the precipitation reactions are generally chemically inhomogeneous and generally comprise mixtures of the oxides, oxide hydrates, hydroxides, carbonates and/or hydrogencarbonates of the metals used. With regard to the filterability of the precipitates, it may prove to be favorable for them to be aged—that is, if they are left to themselves for a certain time after precipitation, optionally under hot conditions or with air being passed through.

The precipitates obtained by these precipitation processes are typically processed, by washing, drying, calcining and conditioning them.

After washing, the precipitates are generally dried at 80 to 200° C., preferably 100 to 150° C., and then calcined.

Calcining is performed generally at temperatures between 300 and 800° C., preferably 350 to 600° C., especially at 450 to 550° C.

After the calcination, the pulverulent catalyst precursors obtained by precipitation reactions are typically conditioned.

The conditioning can be effected, for example, by adjusting the precipitation catalyst to a particular particle size by grinding.

After grinding, the catalyst precursor obtained by precipitation reactions can be mixed with shaping assistants such as graphite or stearic acid and processed further to give shaped bodies.

Standard processes for shaping are described, for example, in Ullmann [Ullmann's Encyclopedia Electronic Release 2000, chapter: "Catalysis and Catalysts", pages 28-32] and by Ertl et al. [Ertl, Knözinger, Weitkamp, Handbook of Heterogeneous Catalysis, VCH Weinheim, 1997, pages 98 ff.].

Standard processes for shaping are, for example, extrusion, tableting, i.e. mechanical pressing, or pelletizing, i.e. compaction by circular and/or rotating movements.

The shaping operation can give shaped bodies with the abovementioned geometry.

The conditioning or shaping is generally followed by a heat treatment. The temperatures in the heat treatment typically correspond to the temperatures in the calcination.

Reduction

Shaped bodies which have been produced by impregnation or precipitation (precipitative application or coprecipitation) generally comprise the catalytically active components, after calcination, generally in the form of the oxygen compounds thereof, for example the metal oxides or hydroxides thereof, such as CoO, NiO, CuO and/or the mixed oxides thereof (catalyst precursors).

The catalyst precursors which have been prepared as described above by impregnation or precipitation (precipitative application or coprecipitation) are generally reduced after the calcination or conditioning. The reduction generally converts the catalyst precursor to the catalytically active form thereof.

The reduction of the catalyst precursor can be performed at elevated temperature in an agitated or unagitated reduction furnace.

The reducing agent used is typically hydrogen or a hydrogen-comprising gas.

The hydrogen is generally used in technical grade purity. The hydrogen can also be used in the form of a hydrogen-comprising gas, i.e. in mixtures with other inert gases, such as nitrogen, helium, neon, argon or carbon dioxide. The hydrogen stream can also be recycled in the reduction as cycle gas, optionally mixed with fresh hydrogen and optionally after removal of water by condensation.

The catalyst precursor is preferably reduced in a reactor in which the shaped bodies are arranged as a fixed bed. Particular preference is given to reducing the catalyst precursor in the same reactor in which the subsequent conversion is effected.

In addition, the catalyst precursor can be reduced in a fluidized bed reactor in the fluidized bed.

The catalyst precursor is generally reduced at reduction temperatures of 50 to 600° C., especially from 100 to 500° C., more preferably from 150 to 450° C. The partial hydrogen pressure is generally from 1 to 300 bar, especially from 1 to 200 bar, more preferably from 1 to 100 bar, the pressure figures here and hereinafter relating to the pressure measured in absolute terms. The duration of the reduction is preferably 1 to 20 hours, and more preferably 5 to 15 hours.

During the reduction, a solvent can be supplied in order to remove water of reaction formed and/or in order, for example, to be able to heat the reactor more quickly and/or to be able to better remove the heat during the reduction. The solvent here may also be supplied in supercritical form.

Suitable solvents used may be the above-described solvents. Preferred solvents are water; ethers such as methyl tert-butyl ether, ethyl tert-butyl ether, dioxane or tetrahydrofuran. Particular preference is given to water or tetrahydrofuran. Suitable solvents likewise include suitable mixtures.

The shaped body thus obtained, after reduction, can be handled under inert conditions. The shaped body can preferably be handled and stored under an inert gas such as nitrogen, or under an inert liquid, for example an alcohol, water or the product of the particular reaction for which the catalyst is used. In that case, it may be necessary to free the catalyst of the inert liquid prior to commencement of the actual reaction.

Storage of the catalyst under inert substances enables uncomplicated and nonhazardous handling and storage of the shaped body.

After reduction, the shaped body can also be contacted with an oxygen-comprising gas stream such as air or a mixture of air with nitrogen.

Thus a passivated shaped body is obtained. The passivated shaped body generally has a protective oxide layer. This protective oxide layer simplifies the handling and storage of the catalyst, such that, for example, the installation of the passivated shaped body into the reactor is simplified. A passivated shaped body is preferably reduced as described above by treatment of the passivated catalyst with hydrogen or a hydrogen-comprising gas prior to contacting with the reactants. The reduction conditions generally correspond to the reduction conditions which are employed in the course of reduction of the catalyst precursors. The activation generally removes the protective passivation layer.

For the preparation and use of heterogeneous catalysts which are used for the polycondensation of diamines to polyamines, it is possible to refer to the details in PF 75 089, pages 11 to 20.

Hydrogen

In the process according to the invention, hydrogen is supplied as gas.

The hydrogen is generally used in technical grade purity. The hydrogen can also be used in the form of a hydrogen-comprising gas, i.e. with additions of other inert gases, such as nitrogen, helium, neon, argon or carbon dioxide. Hydrogen-comprising gases used may, for example, be reformer offgases, refinery gases etc., if and as long as these gases do not comprise any catalyst poisons for the catalysts used, for example CO. Preference is given, however, to using pure hydrogen or essentially pure hydrogen in the process, for example hydrogen having a content of more than 99% by weight of hydrogen, preferably more than 99.9% by weight of hydrogen, more preferably more than 99.99% by weight of hydrogen, especially more than 99.999% by weight of hydrogen.

If the conversion is effected in the presence of hydrogen, high conversions and reaction rates and/or polymerization levels can be achieved without needing to make any alteration to a set pressure or temperature profile. In addition, the polyamines obtained have a relatively low discoloration level.

In a particularly preferred embodiment, the gas supplied comprises at least 50 mol % of hydrogen, more preferably at least 75 mol % of hydrogen and most preferably at least 99 mol % of hydrogen.

In a very particularly preferred embodiment, the gas supplied consists of hydrogen.

Hydrogen is fed continuously into the polymerization reactor below or above the feed point for diamine, preferably below it. The hydrogen leaves the reactor together with the ammonia formed. The ammonia is, for example, condensed by cooling and removed from the process. The hydrogen can likewise be discharged from the process or recycled into the reactor. The pressure in the reactor is optionally kept constant by injecting further hydrogen.

Solvent

The inventive conversion can be performed in substance or in a liquid as a solvent.

Suitable liquids are, for example, liquids which are very substantially inert under the conditions of the conversion.

Preferred liquids are C4 to C12 dialkyl ethers such as diethyl ether, diisopropyl ether, dibutyl ether or tert-butyl methyl ether, or cyclic C4 to C12 ethers such as tetrahydrofuran, 2-methyltetrahydrofuran, 3-methyltetrahydrofuran or dioxane, dimethoxyethane, diethylene glycol dimethyl ether, or hydrocarbons such as pentane, hexane, heptane, 2,2,4-trimethylpentane, octane, cyclohexane, cyclooctane, methylcyclohexane, xylene, toluene or ethylbenzene, or amides such as formamide, dimethylformamide or N-methylpyrrolidone. Suitable liquids may also be mixtures of the aforementioned liquids.

Preference is given to performing the inventive conversion in substance without solvent.

If a solvent is used, the concentration of monomers used at the start of the conversion is generally in the range from 0.1 to 50% by weight, preferably 1 to 40% by weight, more preferably 2 to 30% by weight and most preferably 5 to 25% by weight.

Reactor

The inventive conversion can be conducted continuously, semicontinuously or batchwise. Suspension reactors and fixed bed reactors can be employed.

Suspension

In a particularly preferred embodiment, the catalyst is suspended in the reaction mixture to be polymerized.

Polymerization in suspension mode can preferably be performed in a stirred reactor, jet loop reactor, jet nozzle reactor, bubble column reactor, or in a cascade of such identical or different reactors.

Particular preference is given to performing the polymerization in suspension mode in a stirred reactor.

The settling rate of the catalyst in the liquid diamines or the selected solvent should be low in order that the catalyst can be kept efficiently in suspension.

The particle size of the catalysts used in suspension mode is therefore preferably between 0.1 and 500 μm, especially 1 and 100 μm.

Fixed Bed

In a particularly preferred embodiment, the polymerization is performed in a reactor in which the catalyst is arranged as a fixed bed.

Suitable fixed bed reactors are described, for example, in the article "Catalytic Fixed-Bed Reactors" (Ullmann's Encyclopedia of Industrial Chemistry, Published Online: 15 Jun. 2000, DIO: 10.1002/14356007.b04_199).

Preference is given to performing the process in a shaft reactor, shell and tube reactor or tubular reactor.

Particular preference is given to performing the process in a tubular reactor.

The reactors can each be used as a single reactor, or they can be used as a series of individual reactors and/or in the form of two or more parallel reactors.

In a preferred embodiment, the fixed bed arrangement comprises a catalyst bed in the actual sense, i.e. loose, supported or unsupported shaped bodies which are preferably present in the above-described geometry or shape.

For this purpose, the shaped bodies are introduced into the reactor.

In order that the shaped bodies remain in the reactor and do not fall through it, a grid base or a gas- and liquid-permeable sheet is typically used, on which the shaped bodies rest.

The shaped bodies may be surrounded by an inert material either at the inlet or at the outlet of the reactor. The inert materials used are generally shaped bodies which have a similar geometry to the above-described shaped catalyst bodies but are inert in the reaction, for example Pall rings, spheres of an inert material (e.g. ceramic, steatite, aluminum).

However, the shaped bodies can also be mixed with inert material and be introduced into the reactor as a mixture.

The catalyst bed (shaped bodies+optionally inert material) preferably has a bulk density (to EN ISO 6) in the range from 0.1 to 3 kg/l, preferably from 1.5 to 2.5 kg/l and especially preferably 1.7 to 2.3 kg/l.

Process Parameters

The polycondensation is conducted at temperatures of 100 to 250° C., preferably 120 to 200° C., more preferably 130 to 180° C., especially preferably 150 to 180° C.

The polycondensation is conducted at a pressure at which monomers and oligomers are substantially in the liquid state at the reaction temperature. The polycondensation is effected at a partial hydrogen pressure in the range from 60 to 150 bar, preferably 70 to 150 bar, more preferably 75 to 100 bar. With rising partial hydrogen pressure, polyamines having narrower mean molecular weight are obtained. If no polyamine having a narrow mean molecular weight is required, it is also possible to work at partial hydrogen pressures below 60 bar.

The catalyst hourly space velocity in continuous mode is 0.1 to 1.5 kg, preferably 0.3 to 1.4 kg and more preferably 0.5 to 1.3 kg, of reactant per liter of catalyst and hour.

The residence time in batchwise or semicontinuous mode is typically 0.5 to 3, preferably 0.5 to 2.5 and more preferably 0.5 to 1.5 hours.

Supply of the Monomers

In a batchwise process, the diamines are preferably initially charged in the reactor. For this purpose, the diamines can be conveyed into the reactor with suitable conveying apparatus, for example liquid pumps, vacuum conveyors or pneumatic conveyors. Suitable apparatuses for filling a reactor, depending on the state of matter of the substance to be conveyed, are known to those skilled in the art.

The diamines are preferably conveyed into the reactor in the liquid state. For this purpose, it may be necessary to heat the diamines to a temperature above the melting point or solidification point thereof and/or to work under a pressure at which the diamines are in the liquid state. In addition, it may be preferable to dissolve the diamines in one of the aforementioned solvents.

In a continuous reactor, the diamines are preferably pumped into the reactor in the liquid state.

The flow of the feedstocks in the reactor may be from the top downward (trickle mode) or from the bottom upward (liquid phase mode).

Gas Supply

The amount of gas supplied is preferably in the range from 1 to 1000 liters of gas per hour per liter of free reactor volume, more preferably 5 to 500, even more preferably 10 to 300 and especially preferably 50 to 200 liters of gas per hour per liter of free reactor volume, where the free reactor volume should be understood to mean the difference between the empty reactor volume and the volume of the catalyst charge (including the internals). The free reactor volume corresponds to the volume of a liquid which is required to completely fill the catalyst-charged reactor (including all internals).

If the gas supply rate is within the aforementioned range, both a high polymerization rate and high molecular weight can be achieved.

The supply of the gas is preferably continuous, i.e. essentially without interruption.

However, the supply can also be periodic or aperiodic with periodic or aperiodic interruptions, in which case it is advantageous that the average interruptions are shorter than the average supply phases. Preferably, the average interruptions are shorter than 15 minutes, preferably shorter than 2 minutes and more preferably shorter than 1 minute.

Preferably, the supply of the gas is homogeneous over the duration of the conversion, i.e. is without any great variations with time. In a batchwise or semibatchwise process, the supply flow rate of gas can increase with increasing reaction time, although the upper limit of the preferred range should preferably not be exceeded. Thus, the amount of monomers which may be entrained out of the reactor with the gas is reduced.

Most preferably, the gas supply is continuous, i.e. essentially without interruption.

In a batchwise process, the supply of the gas is preferably separate from the supply of the diamines.

In a batchwise process, the supply of the gas may be simultaneous together with the diamines via one or more separate inlets.

Gas Dispersion

In a very particularly preferred embodiment, the gas supplied is dispersed in the liquid phase. Dispersion is understood to mean the fine and very substantially homogeneous distribution of the gas in the liquid phase.

In a preferred embodiment, dispersion of the gas in the liquid phase can be achieved by passing the gas into the reactor through suitable entry orifices.

In a further preferred embodiment, dispersion of the gas in the liquid phase can be achieved by the action of flow-generated shear stresses on the gas supplied, which causes sufficient deformation in the gas supplied against the stabilizing effect of interfacial tension, such that the gas stream is divided into bubbles. The energy input for generation of shear stress which acts on the gas or gas bubbles can be effected, for example, through the input of energy into the dispersion medium, for example by the generation of a flow into the dispersion medium, i.e. the liquid phase. Preference is given to generation of a turbulent flow. A flow can, as described below, be effected, for example, by stirring or circulation of the liquid phase.

The greatest coherent gas volume in the liquid phase should preferably not exceed a maximum of 1%, better 0.1%, of the stirred tank volume (above the liquid phase, in the upper region of the reactor, a greater gas volume may be present). It is preferable that the diameter of the gas bubbles, and hence the greatest coherent gas space in the liquid phase, is in the range from diameter 0.1 mm to 100 mm, more preferably in the range from 0.5 to 50 mm and most preferably in the range from 1 to 10 mm.

The dispersion of the gas in the liquid phase has the advantage that the ammonia formed in the conversion of the diamines to polyamine can be converted to the gas phase and removed from the reactor. By removal of the ammonia formed together with the gas supplied, it is possible to achieve polyamines having a high molecular weight and a low degree of branching.

Entry Orifices

In a preferred embodiment, the gas is introduced through one or more entry orifices. Preferred entry orifices are a gas inlet tube, a distributor ring or a nozzle. The term "nozzle" typically refers to a pipe which narrows in flow direction.

In order to achieve homogenization of the distribution of the gas-liquid phase mixture, it is additionally preferable to use distributor apparatus, for example sintered or perforated plates in the region of the feed orifices. The perforated plates or sintered trays may be distributed over the entire cross section or part of the cross-sectional area of the reactor.

Most preferably, the distribution of the gas in the liquid is improved by distributing the entry orifices homogeneously over the cross section of the reactor, as, for example, in the case of a distributor ring.

Discharge

In a preferred embodiment, the gas supplied is removed from the reactor together with ammonia which is formed in the conversion of the diamines to polyamine.

The removal of ammonia from the reactor has the advantage that high degrees of polymerization and a good space-time yield can be achieved.

The gas supplied and the ammonia formed in the conversion can be removed from the reactor essentially separately or together with the liquid phase.

The gas which is supplied to and removed from the reactor is measured in L (STP) (standard liters) in accordance with DIN 1343 and is in the range from 1 to 1000 L (STP) per unit free reactor volume, the free reactor volume being regarded as the difference between the empty reactor volume and the volume of the catalyst charge (including the internals). The free reactor volume corresponds to the volume of a liquid which is required to fill the reactor charged with catalyst (including all internals).

Separate Discharge of the Gas Stream

In a preferred embodiment, the gas and the ammonia are removed from the reactor essentially separately from the liquid phase.

The gas supplied is preferably discharged from the reactor at a gas outlet together with the ammonia formed. The gas outlet is preferably a valve, since the conversion of the diamines is preferably performed at relatively high pressures. The gas outlet, however, may also be a simple orifice, for example a pipeline. If the gas supplied is to be discharged together with the ammonia formed and separately from the liquid phase, it is possible to take measures such that the liquid phase is not discharged from the reactor together with the gas. For this purpose, the gas outlet may be positioned in the upper region of the reactor in the gas space above the level of the liquid phase. However, it is also possible to provide a membrane, a sintered plate or a frit pervious only to the gas phase in front of the gas outlet in order to retain the liquid phase in the reactor.

The gas stream removed from the reactor can suitably be disposed of or worked up.

In a particularly preferred embodiment, the gas stream removed from the reactor is recycled back into the reactor.

This has the advantage that the material input costs can be reduced.

In a very particularly preferred embodiment, ammonia is removed from the gas stream prior to the recycling thereof.

This is preferably done by condensing ammonia out of the gas stream, so as to obtain a gas stream essentially free of ammonia, and to obtain a liquid stream comprising ammonia.

It is additionally preferable to remove any entrained diamine or oligomers of the diamine from the gas stream prior to the recycling thereof.

In a very particularly preferred embodiment, entrained diamine or oligomers of the diamine are first removed from the gas stream, followed by the removal of ammonia from the gas stream.

For removal of any entrained amounts of liquid, for example diamines, oligomers of diamine and/or solvents, the discharged gas is introduced into a phase separator or liquid separator. In the phase separator, the entrained liquid phase is separated from the gas phase comprising ammonia and gas supplied.

The liquid phase which has been separated out in the phase separator and consists essentially of unconverted monomers or lower oligomers can preferably be recycled into the reactor or used in a subsequent reaction. This has the advantage that yield losses, based on the diamine used, can be reduced. It is preferable that the recycled stream composed of diamine, oligomers of the diamine and possibly solvents is essentially free of ammonia. This is generally already achieved downstream of the liquid remover. Should the recycled stream nevertheless comprise ammonia, ammonia can be removed from the liquid phase separated out in the phase separator, for example by distillation or degassing (stripping).

The separation of ammonia from the gas stream discharged can preferably be effected by cooling the gas stream by means of a cooling apparatus to a temperature at which ammonia is converted to the liquid state, and the gas supplied remains in the gas phase. The cooling apparatus is preferably a condenser.

In general, ammonia is condensed out of the gas stream, so as to obtain a gas stream essentially free of ammonia, and to obtain a liquid stream comprising ammonia, and the gas which has been removed from ammonia can optionally be recycled into the reactor.

The condenser may be configured from virtually all condensers known to those skilled in the art, for example plate condenser, shell and tube condenser or coil condenser. The condenser is preferably configured as a shell and tube condenser. The condenser may be operated horizontally or vertically; the condensation may take place in the shell space or in the tubes.

Downstream of the cooling apparatus, the gas stream generally comprises only the gas supplied, since the ammonia present in the gas stream has been condensed out.

The uncondensed gas stream is preferably recycled into the reactor. It is preferable that the stream recycled comprises essentially no ammonia. This is generally already achieved downstream of the cooling apparatus. Should the ammonia contents nevertheless be higher, the gas stream can be cooled again, for example at lower temperatures.

In a less preferred embodiment, ammonia is first removed from the gas stream together with the entrained liquid phase, by cooling the gas stream such that ammonia is liquefied, and the liquid phase is separated from the gas phase.

The separation of ammonia from the gas stream discharged can preferably be effected by cooling the gas stream by means of a cooling apparatus to a temperature at which ammonia is converted to the liquid state, and the gas supplied remains in the gas phase. The cooling apparatus is preferably a condenser. The cooling apparatus is preferably a condenser.

The condenser may be configured from virtually all condensers known to those skilled in the art, for example plate condenser, shell and tube condenser or coil condenser. The condenser is preferably configured as a shell and tube condenser. The condenser may be operated horizontally or vertically; the condensation may take place in the shell space or in the tubes.

The liquid phase removed comprises, as well as ammonia, possibly also entrained amounts of diamine, oligomers of diamine and possibly solvents.

Preferably, ammonia is removed from the liquid phase diamine or oligomers of the diamine, for example by distillation, degassing (stripping) or vaporization of the ammonia. The liquid phase which remains after the removal of the ammonia can be recycled into the reactor or used in a subsequent conversion. The liquid phase composed of diamine, oligomers of diamine and possibly solvents, which is recycled or reused, is preferably essentially free of ammonia.

The uncondensed gas phase comprising inert gas and/or hydrogen can be discharged from the reactor or preferably recycled into the reactor.

Discharge Together with Reaction Output

In a further particularly preferred embodiment, the gas supplied and the ammonia formed are discharged from the reactor together with a portion of the liquid phase.

This mode of operation is preferred in continuous mode, especially in the case of use of a fixed bed reactor.

Preferably, the liquid phase is discharged from the reactor through a liquid outlet together with the gas dispersed in the liquid phase and the ammonia formed. The liquid outlet is generally a pipeline with a valve at the end thereof.

If the catalyst is used not in the form of a fixed bed but in the form of a suspension, it is preferable to separate the catalyst from the reactor output prior to further workup. For this purpose, the reactor output can, for example, be filtered. In the case of a continuous process, the catalyst can be effected, for example, by crossflow filtration. The catalyst can also be removed from the reactor by centrifugation or sedimentation.

Flash Evaporation

It is additionally preferable that the reactor output is decompressed at the reactor outlet, such that ammonia which is still present in the liquid phase and is still in the liquid state is very substantially converted to the gas phase.

For this purpose, the reactor output is generally transferred through a valve into a space with pressure lower than that existing in the reactor, but at which unconverted diamine monomer still remains in the liquid phase. Preferably, the reduced pressure in the vessel in which the reaction output is decompressed is about 10 to 50% lower than the pressure in the reactor.

Preferably, the gas phase comprising ammonia and the gas supplied is separated from the liquid phase comprising polyamine, oligomers of the diamine and diamine, and possibly solvents. The liquid phase is preferably, as described below, recycled into the reactor. It is preferable that the liquid phase recycled, comprising diamine, oligomers of the diamine and possibly solvents, is essentially free of ammonia. This is generally already achieved after the flash evaporation. Should the ammonia contents nevertheless be higher, ammonia can be removed from the liquid phase separated out in the phase separator, for example by distillation or degassing (stripping).

The fraction of the components still in gaseous form after the flash evaporation is preferably partially condensed in a condenser, the condensation preferably being operated such that ammonia is essentially fully condensed. The gas supplied, for example inert gas and/or hydrogen, is preferably not condensed. Ammonia is preferably discharged from the process.

The uncondensed gas, which consists essentially of inert gas and/or hydrogen, is preferably recycled into the process. The gas recycled preferably comprises essentially no ammonia.

Workup—Distillation Unit K1

In a very particularly preferred embodiment, the reaction output is decompressed into a distillation unit.

The distillation unit is generally operated such that ammonia and gas supplied are drawn off at the top of the distillation unit and the rest of the liquid phase (monomer, oligomers and polymers) is drawn off at the bottom of the distillation unit (variant 1).

However, the distillation unit K1 can also be operated in such a way that ammonia and the gas supplied are drawn off at the top, monomeric and oligomeric diamine are drawn off from a side draw in the middle region of the distillation unit, and higher molecular weight polyamine is drawn off at the bottom of the distillation unit (variant 2).

The exact operating conditions of the distillation unit can, in accordance with the separation performance of the distillation unit used, be determined in a routine manner by the person skilled in the art by customary calculation methods using the known vapor pressures and evaporation equilibria of the components introduced into the distillation unit.

Variant 1

The reactor output is decompressed, preferably into the middle region, of a distillation unit K1.

The distillation unit K1 is more preferably a tray column. In a tray column, there are intermediate trays on which the mass transfer takes place within the column. Examples of different tray types are sieve trays, tunnel-cap trays, dual-flow trays, bubble-cap trays or valve trays.

In a further preferred embodiment, the distillative internals may alternatively be present as an ordered packing, for example as a sheet metal packing, such as Mellapak 250 Y or Montz Pak, B1-250 type, or as a structured ceramic packing or as an unordered packing, for example composed of Pall rings, IMTP rings (from Koch-Glitsch), Raschig Superrings, etc. At the top of the distillation unit K1, a gaseous stream composed of the gas supplied and ammonia is generally obtained.

In a particularly preferred embodiment, ammonia is separated from the gas stream obtained at the top. The separation of ammonia from the gas stream discharged can preferably be effected by cooling the gas stream by means of a cooling apparatus to a temperature at which ammonia is converted to the liquid state, and the gas supplied remains in the gas phase. The cooling apparatus is preferably a condenser.

The condenser of the distillation unit K1 is generally operated at a temperature at which the ammonia is very substantially condensed at the corresponding top pressure.

The condensed ammonia is preferably discharged from the process.

The uncondensed gas, which consists essentially of inert gas and/or hydrogen, is preferably recycled into the process. The recycled gas preferably comprises less than 5% by weight of ammonia.

The distillation unit K1 generally does not require any additional evaporator at the bottom of the distillation unit, since the difference between the boiling points of ammonia and monomeric diamine is generally sufficiently high that good separation of ammonia and monomeric diamine is possible without additional heating at the bottom.

However, it is also possible to heat the bottom of the distillation unit, for example with a reboiler.

In that case, the temperature at the bottom of the distillation unit should be adjusted such that ammonia very substantially evaporates at the top pressure that exists in the distillation unit, while monomeric diamine remains in the liquid phase.

The bottoms output from the distillation unit K1 comprises essentially diamine, oligomers of the diamine, polyamine and possibly solvents.

A portion of the bottoms output can be a) recycled to the reactor, or
b) introduced into a further distillation unit K2 in which monomeric diamine and low-boiling oligomer is separated from higher-boiling polyamine, or
c) withdrawn from the reactor as reaction product.
d) A portion of the bottoms output from the distillation unit K1 can be recycled into the reactor, where a further condensation takes place. Thus, polymers having a particularly high molecular weight can be achieved.

It is preferable that the bottoms output recycled comprises essentially no ammonia. This is generally already achieved after the flash evaporation (distillation). Should the ammonia contents nevertheless be higher, the ammonia content can be reduced, for example by distillation or degassing (stripping).

a) The bottoms output from the distillation unit K1 can be introduced into a further distillation unit K2, which is operated in such a way that monomeric diamine and low-boiling oligopolyamine are obtained at the top of the distillation unit, and polyamine is drawn off at the bottom of the distillation unit. The distillation unit K2 is described in detail below.

b) A portion of the bottom product from the distillation unit K1 can be discharged from the process as reaction product.

Variant 2

The distillation unit K1 can also be operated in such a way that ammonia and the gas supplied are obtained at the top of the distillation unit, a fraction comprising monomeric diamine and lower-boiling oligomers is withdrawn as a side draw product in the middle region, and polyamine is obtained at the bottom of the distillation unit K1.

The reactor output is, as in the above-described variant 1, preferably decompressed into the middle region of a distillation unit K1 as described above.

At the top of the distillation unit K1, a gaseous stream composed of the gas supplied and ammonia is generally obtained.

In a particularly preferred embodiment, ammonia is separated from the gas stream obtained at the top. The separation of ammonia from the gas stream discharged can preferably be effected by cooling the gas stream by means of a cooling apparatus to a temperature at which ammonia is converted to the liquid state, and the gas supplied remains in the gas phase. The cooling apparatus is preferably a condenser.

The condenser of the distillation unit K1 is generally operated at a temperature at which the ammonia is very substantially condensed at the corresponding top pressure.

The condensed ammonia is preferably discharged from the process.

The uncondensed gas, which consists essentially of inert gas and/or hydrogen, is preferably recycled into the process.

The distillation unit K1 generally does not require any additional evaporator at the bottom of the distillation unit, since the difference between the boiling points of ammonia and monomeric diamine is generally sufficiently high that good separation of ammonia and monomeric diamine is possible without additional heating at the bottom.

However, it is also possible to heat the bottom of the distillation unit, for example with a reboiler.

The temperature at the bottom of the distillation unit should be adjusted such that ammonia is very substantially evaporated at the top pressure that exists in the distillation unit, while monomeric diamine remains in the liquid phase.

The side draw product drawn off from the distillation unit K1 is preferably a fraction comprising essentially oligomers of the diamine and diamine.

The side draw product can be a) discharged from the process, or
b) recycled into the process (preferred variant).

When the side draw product is recycled into the process, it is preferable that the side draw product comprises essentially no ammonia. This is generally already achieved after the flash evaporation (distillation). Should the ammonia contents nevertheless be higher, the ammonia content can be reduced, for example by distillation or degassing (stripping).

The bottoms output from the distillation unit K1 comprises essentially diamine, oligomers of the diamine, polyamine and possibly solvents.

A portion of the bottoms output can, as described in variant 1, be a) recycled to the reactor, or
b) introduced into a further distillation unit K2 in which monomeric diamine and low-boiling oligomer are separated from higher-boiling polyamine, or
c) withdrawn from the reactor as reaction product.

Workup—Distillation Unit K2

The bottoms output from distillation unit K1 can be introduced into a further distillation unit K2, which is operated in such a way that monomeric diamine and low-boiling oligomers are obtained at the top of the distillation unit, and polymeric polyamine is obtained at the bottom of the distillation unit. The distillation unit K2 can also be operated in such a way that predominantly monomeric diamine can be drawn off at the top, predominantly oligomeric diamine at a side draw and polymeric diamine at the bottom.

The bottoms output from the distillation unit K1 is preferably supplied to the middle region of a distillation unit K2.

Preferably, the distillation unit K2 has internals for increasing the separation performance. The distillative internals may be present, for example, as an ordered packing, for example as a sheet metal packing such as Mellapak 250 Y or Montz Pak, B1-250 type. It is also possible for a packing with lower or elevated specific surface area to be present, or it is possible to use a fabric packing or a packing with another geometry such as Mellapak 252 Y. What is advantageous about the use of these distillative internals is the low pressure drop and low specific liquid holdup compared to valve trays, for example. The internals may be present in one or more beds.

The bottom of the distillation unit K2 is preferably equipped with a reboiler.

The temperature in the bottom of the distillation unit should be adjusted such that ammonia monomeric diamine very substantially evaporates and a portion of the oligomers evaporates at the top pressure that exists in the distillation unit, while polymeric polyamine remains in the liquid phase.

At the top of the distillation unit K2, a gaseous stream consisting essentially of monomer diamine and other low boilers is generally drawn off.

Preferably, the gas stream obtained at the top is fed to a condenser connected to the distillation unit K2.

The condenser of the distillation unit K2 is generally operated at a temperature at which the diamine is very substantially condensed at the corresponding top pressure.

The condensate of the distillation unit K2, which consists essentially of monomeric diamine and other low boilers, can be discharged or recycled into the process.

The diamine recycled preferably comprises essentially no ammonia.

This has the advantage that polyamines having high molecular weight and low degrees of branching can be obtained. In addition, the reaction time until attainment of a certain degree of conversion can be reduced (increased reaction rate). Should the ammonia content be relatively high, the diamine can be subjected to a further distillation or degassing operation, for example to a stripping operation.

A portion of the diamine obtained as condensate can be recycled into the distillation unit as reflux.

A portion of the bottoms output can be recycled to the reactor, or withdrawn from the reactor as reaction product. Preferably, the bottom product of the distillation unit K2 is discharged as reaction product.

In the distillation unit K2 it is also possible to withdraw a side draw product comprising a fraction composed of low-boiling oligomers. These oligomers can be discharged, or recycled into the reactor together with the diamine discharged at the top.

Preferred Process Variants

K2 can also be reduced to an evaporator and/or combination of a plurality of evaporators.

The distillation unit K2 can also be operated as a stripping column, such that low boilers (monomeric diamine and oligomers) are drawn off at the top of the column with the aid of a stripping agent and polymeric polyamines are obtained at the bottom. Useful stripping agents include substances whose boiling point is lower than the boiling point of the low boilers to be removed (e.g. preferably nitrogen, methanol, monomeric diamine, ammonia, hydrogen) and which do not react with diamines, oligomeric diamines and polyamines.

It is possible to dispense with further internals in the case of a stripping column, in order to minimize pressure drops.

FIGS. 2 to 7 describe particular embodiments of the process according to the invention.

Variant D-1

Figure 2:
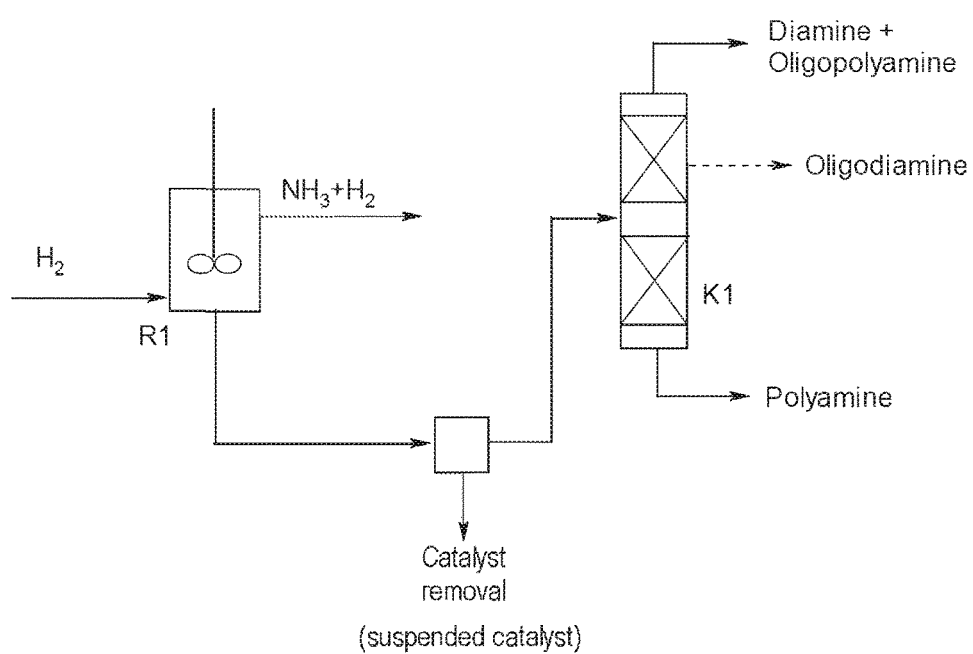

FIG. 2 shows a batchwise process in which monomer is initially charged in a stirred tank reactor R 1 comprising the catalyst in suspended or fixed form, for example in a metal mesh. Then inert gas and/or hydrogen is passed in continuously. The introduction is preferably effected through a gas inlet tube, a gas distributor ring or a nozzle, which is preferably arranged below a stirrer. The gas stream introduced is broken up into small gas bubbles by the energy input of the stirrer and distributed homogeneously in the reactor. A mixture of ammonia formed and inert gas and/or hydrogen is discharged continuously from the reactor through an outlet orifice in the upper region of the reactor.

If the batchwise polycondensation is performed not in the presence of a fixed catalyst but of a suspended catalyst, the suspension catalyst is first removed, for example by filtration or centrifugation, when the product is discharged in the course of workup of the product of value.

The reaction output obtained in the batchwise polycondensation can be passed into a distillation unit K1 in which a stream of diamine and oligomers of the diamine is removed at the top. Polyamine is obtained at the bottom of the distillation unit.

The reaction output obtained in the batchwise polycondensation can alternatively be passed into a distillation unit K1 in which a stream of diamine is removed at the top and, as a side draw product, a fraction consisting essentially of oligomers of the diamine is removed. Polyamine is drawn off at the bottom of the distillation unit.

Variant D-2

Figure 3:
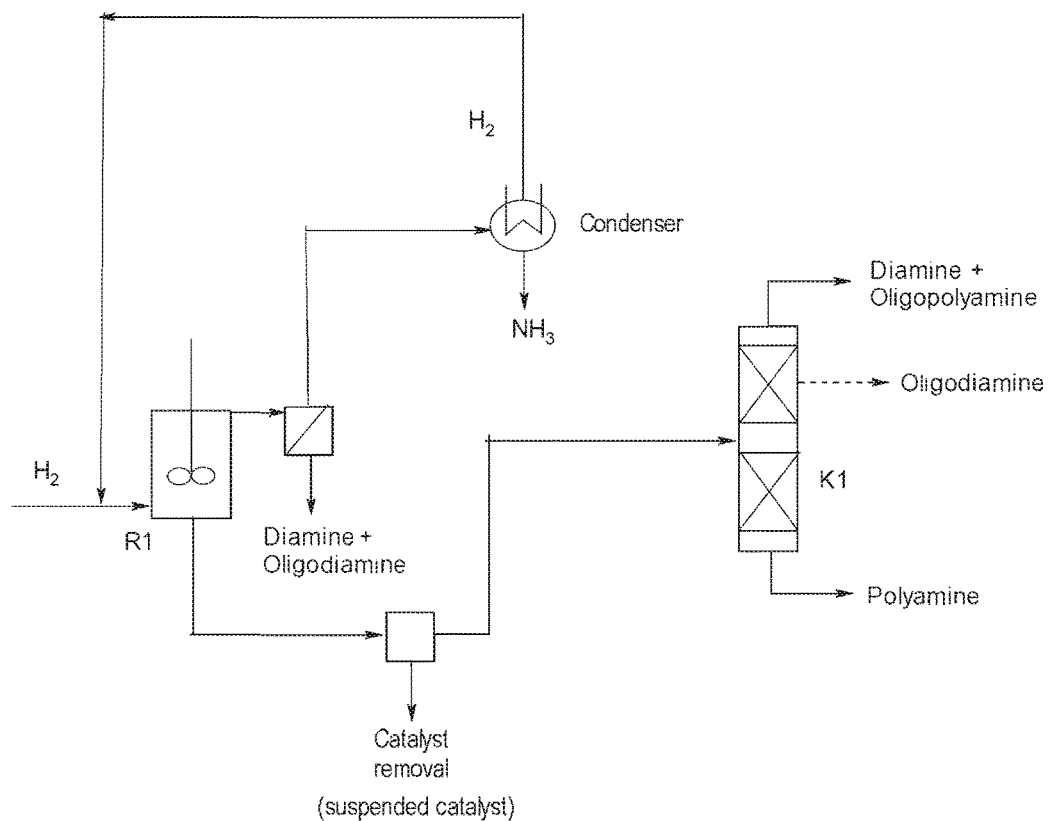

FIG. 3 shows a variant of the process in which the discharged gas stream is decompressed after discharge. For removal of entrained liquid, the gas stream drawn off is introduced into a liquid separator. The liquid separated out in the liquid separator is discharged from the process. Downstream of the liquid separator, the mixture of ammonia and inert gas and/or hydrogen discharged from the reactor is preferably cooled, which liquefies the ammonia, allowing it to be separated from the inert gas and/or hydrogen. The inert gas and/or hydrogen can be compressed again, if necessary admixed with fresh inert gas and/or hydrogen, and recycled into the polymerization stage.

Variant D-3

Figure 4:
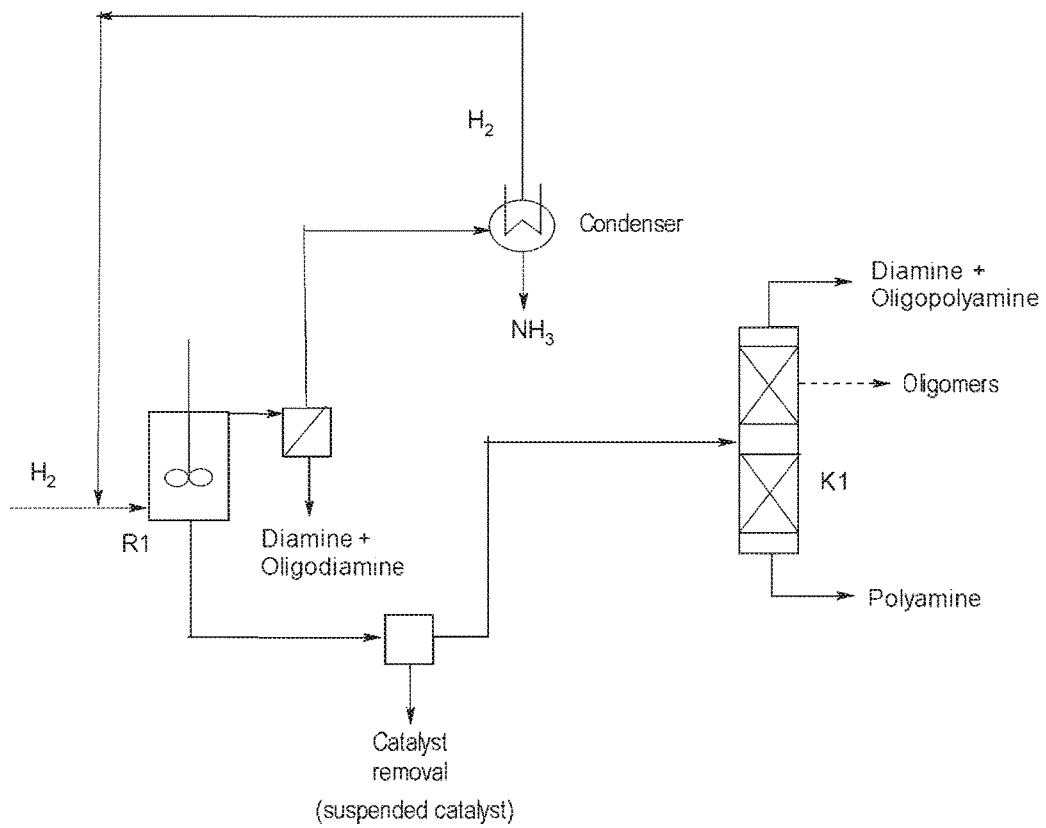

FIG. 4 shows a further variant in which the liquid separated out in the liquid separator, which consists essentially of diamine, oligomers of the diamine and possibly solvents, is recycled into the process. Should the mixture of diamines and/or oligomers of the diamines comprise by-products, these can be separated, for example by distillation, from the diamines and oligomers thereof prior to the recycling thereof. For instance, in the case of the inventive polycondensation of 1,3-propanediamine, N-propyl-1,3-propanediamine, for example, can form as a by-product, which can be removed by distillation.

Variant K-1

Figure 5:
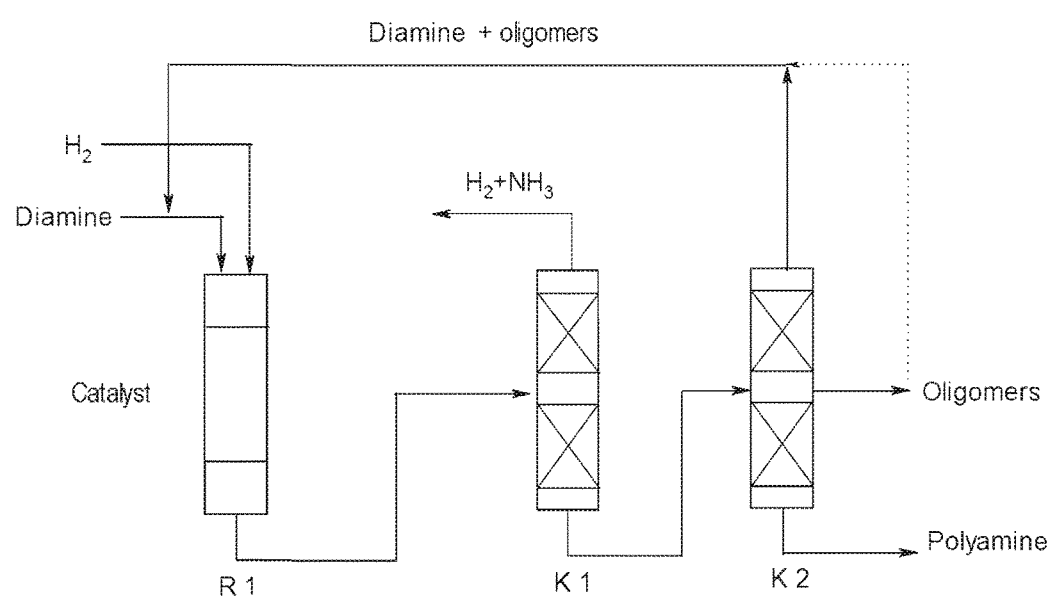

FIG. 5 shows a continuous process for preparing polyamines. Diamine is passed together with inert gas and/or hydrogen over a catalyst arranged in fixed bed form in an inertized pressure reactor R1.

The reaction output is passed to a distillation unit K1. A mixture of ammonia and hydrogen is the overhead product of the distillation unit K1, and this is discharged from the process. The bottom product of the distillation unit K1 is conducted to a distillation unit K2.

Unconverted diamine is removed as the overhead product of the distillation unit K2 and recycled into the reactor R1. From a side draw of the distillation unit K2, oligomers are optionally drawn off, which are discharged and/or recycled into the reactor R1. The bottom product of the distillation unit K2 comprises polyamine.

Variant K-2

Figure 6:
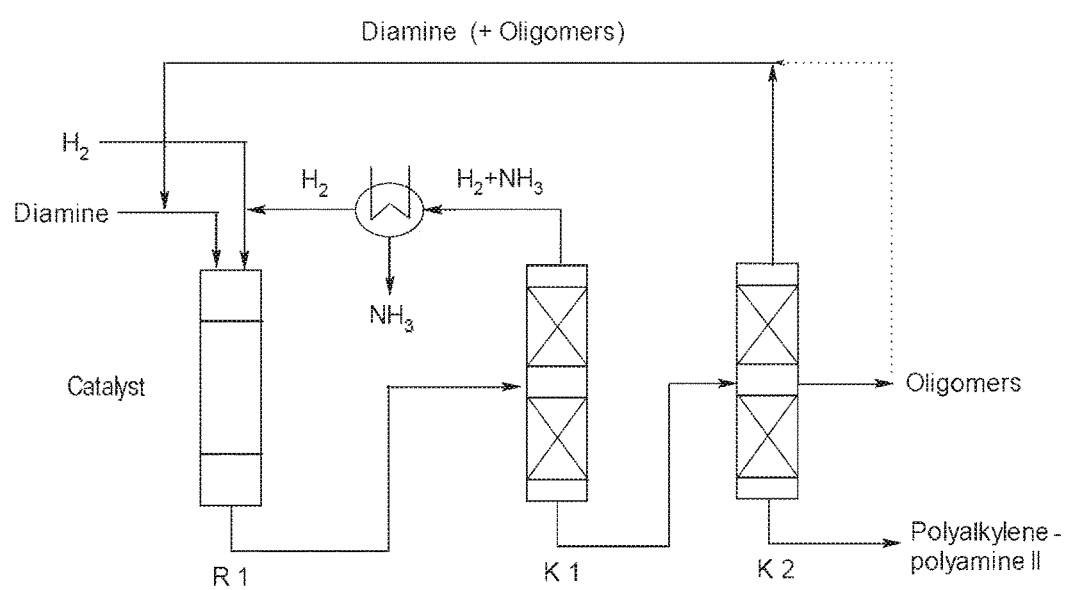

FIG. 6 shows a continuous process for preparing polyamines. Diamine is passed together with inert gas and/or hydrogen over a catalyst arranged in fixed bed form in an inertized pressure reactor R1.

The reaction output is passed to a distillation unit K1. The overhead product of the distillation unit K1 is a mixture of ammonia and hydrogen, out of which the ammonia is condensed. Inert gas and/or hydrogen can be recycled into the reactor R1.

The bottom product of the distillation unit K1 is conducted to a distillation unit K2. Via the top of the distillation unit K2, unconverted diamine and low-boiling oligomer are removed and recycled into the reactor R1. From a side draw of the distillation unit K2, oligomers are optionally drawn off, which are discharged and/or recycled into the reactor R1. The bottom product of the distillation unit K2 comprises polyamine.

Variant K-3

Figure 7:
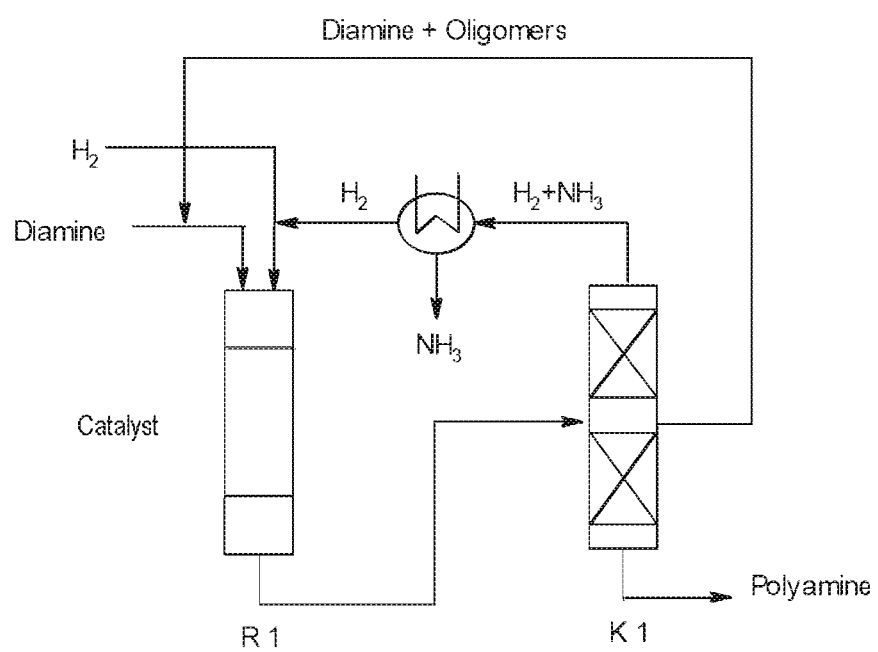

FIG. 7 shows a variant of the continuous process.

Diamine is passed together with inert gas and/or hydrogen over a catalyst arranged in fixed bed form in an inertized pressure reactor R1. Under the reaction conditions, a reaction output is formed, which is passed to a distillation unit K1. The distillation unit K1 is operated such that the top product obtained is a mixture of ammonia and inert gas and/or hydrogen mixture, a mixture of diamine and oligomers of the diamine is withdrawn from a side draw and polyamine is withdrawn as the bottom product. The distillation unit K2 in FIG. 5 or 6 is dispensed with.

According to the invention, the polymerization output is preferably worked up in such a way that unconverted diamine and oligomeric diamines having a boiling point less than <300° C., preferably <250° C., more preferably of <200° C., at 10 mbar are depleted from the polymers by distillation. The mixture of unconverted diamines and oligomers can be recycled into the reactor without further workup.

For removal, preference is given to using a distilling unit supported by stripping agents, in order to obtain concentrations of low boilers of <5% by weight, preferably <1% by weight, more preferably <0.1% by weight, in the bottom product of the polyamines.

The low boilers are very substantially depleted at pressures of 0.5 to 1000 mbar, preferably 0.5-500 mbar, more preferably 0.5-50 mbar, and temperatures of 150-300° C., preferably 165-265° C., more preferably 180-230° C.

Useful stripping agents include substances whose boiling point is lower than the boiling point of the low boilers to be removed (e.g. preferably nitrogen, methanol, monomeric diamine, ammonia, hydrogen) and which do not react with diamines, oligomeric diamines and polyamines. Preference is given to using nitrogen as the stripping agent.

The amount of stripping agent in relation to the mass of the bottom product from K1 may vary <1000 L (STP) of stripping agent/kg of K1 bottom product, preferably <600 L (STP)/kg and most preferably <300 L (STP)/kg.

The inventive distillations or evaporations can be conducted in any suitable apparatus known to those skilled in the art. Suitable apparatus for this purpose are as described, for example, in Kirk-Othmer, Encyclopedia of Chemical Technology, 4th edition, volume 8, John Wiley and Sons, New York 1996, pages 334 to 348, such as sieve tray columns, bubble-cap tray columns, columns with structured packing and columns with random packing.

Useful one-stage evaporators include falling film evaporators, thin film evaporators, flash evaporators, multiphase helical tube evaporators, natural circulation evaporators or forced circulation flash evaporators.

Polyamines

By means of the above-described process, it is possible to prepare polyamines (hereinafter also "polymers") having particular properties.

The present invention therefore also relates to homo- and copolymers obtainable by inventive conversion of the abovementioned diamine monomers.

The polymers can be prepared from repeat units formed from only one kind of diamine monomer (referred to hereinafter as homopolymers). The polymers can alternatively be prepared from mixtures of two or more different kinds of diamine monomer (referred to hereinafter as copolymers).

Preferred polymers are polymers formed from at least one diamine selected from the group consisting of 1,3-propylenediamine, 1,2-propylenediamine, 1,4-butylenediamine, 1,2-butylenediamine, 1,5-diaminopentane, 1,2-diaminopentane, 1,6-diaminohexane, 1,2-diaminohexane, 1,7-diaminoheptane, 1,2-diaminoheptane, 1,8-diaminooctane, 1,2-diaminooctane, 1,9-nonamethylenediamine, 1,10-decamethylenediamine, 1,11-undecamethylenediamine, 1,12-dodecamethylenediamine, 2,2-dimethylpropane-1,3-diamine and 3-(methylamino)propylamine.

Further preferred polymers are polymers formed from at least one diamine selected from the group consisting of N,N-bis(3-aminopropyl)methylamine, diethylenetriamine (DETA), triethylenetetramine (TETA), tetraethylenepentamine (TEPA), di-1,3-propylenetriamine, tri-1,3-propylenetetramine, tetra-1,3-propylenepentamine, di-1,2-propylenetriamine, tri-1,2-propylenetetramine, tetra-1,2-propylenepentamine, dihexamethylenetriamine, trihexamethylenetetramine and tetrahexamethylenepentamine.

Further preferred polymers are polymers formed from at least one diamine selected from the group consisting of 3,3'-dimethyl-4,4'-diaminodicyclohexylmethane, 4,4'-diaminodicyclohexylmethane, isophoronediamine, [bis(4-aminocyclohexyl)methane], [bis(4-amino-3,5-dimethylcyclohexyl)methane], [bis(4-amino-3-methylcyclohexyl) methane], 3-(cyclohexylamino)propylamine, piperazine and bis(aminomethyl)piperazines.

Likewise preferred polymers are polymers formed from at least one diamine selected from the group consisting of 4,7,10-trioxatridecane-1,13-diamine, 4,9-dioxadodecane-1,12-diamine and Jeffamines® from Huntsman, especially Jeffamine D230, Jeffamine D400, Jeffamine D2000, Jeffamine D4000, Jeffamine ED600, Jeffamine ED900, Jeffamine ED2003, Jeffamine EDR148 and Jeffamine EDR176 (names from the product brochure from Alfa Chemicals Ltd. with reference number "Hunt32").

The polymers prepared by means of the above-described process comprise diamine monomers of the formula

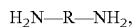

where the aforementioned diamines can be used as monomers.

The polymers comprise repeat units of the formula

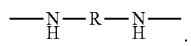

The repeat units may be joined in a linear manner or have branches.

In the case of linear linkage (L), two repeat units are joined via a secondary amine (—NH—).

A branch (D) refers to a linkage in which three repeat units are joined via a tertiary amine (—N<).

The polymers may have primary amine end groups (—NH2) (T).

From the proportion of linear linkages (L), of primary amine end groups (TO) and of branches (D), it is possible to calculate the degree of branching (DB).

DB is defined as follows:

$$DB=(D+T)/(D+T+L)$$

where

D (dendritic) corresponds to the number of tertiary amino groups in the polymer, L (linear) corresponds to the number of secondary amino groups in the polymer, and T (terminal) corresponds to the number of primary amino groups in the polymer.

The degree of branching can be found by determining the primary, secondary and tertiary amine numbers. The determination of the primary, secondary or tertiary amine number can be effected to ASTM D2074-07.

The degree of branching can also be determined qualitatively by means of $^{15}N$ NMR. Preferably, the inventive polyamines have no signal or only a weak signal in the range typical of tertiary nitrogen atoms. This can be viewed as an indicator of a low degree of branching.

The repeat units can thus be linked to give unbranched or branched polymer chains, or to give unbranched or branched polymeric rings. In the case of rings, at least two end groups of the same linear or branched chains are joined, so as to form a ring structure. The probability that two primary amine groups of the same chain will be joined to form a ring falls with the number of repeat units between the primary amine groups which are joined.

The inventive polymers may preferably have at least one, or any combination of 2 or more, of the following properties a) to i):

a) Degree of Branching

The polymers generally have a high proportion of repeat units joined in a linear manner.

The degree of branching (DB) is preferably in the range from 0 to 1, more preferably in the range from 0 to 0.5 and most preferably in the range from 0.01 to 0.3.

Polymers having a low degree of branching have good processing properties. They are particularly suitable for further reactions in which the polymer is chemically modified (alkoxylation, for example with ethylene oxide and/or propylene oxide), reaction with isocyanates, reaction with acrylonitrile, reaction with epichlorohydrin, reaction with ethylene dichloride, reaction with esters/acids, quaternization with methyl chloride or dimethyl sulfate), since the conversion of inventive polyamines generally results in a relatively small viscosity rise compared to branched polyamines.

b) Degree of Polymerization

The mean number of repeat units Pn of the monomers in the polymers is generally between 4 and 50 000.

In a particularly preferred embodiment, the polymers have a high mean molecular weight, i.e. a degree of polymerization Pn of 4 or more, preferably 10 or more, especially preferably 15 or more and most preferably 20 or more.

The number of repeat units is preferably in the range from 4 to 1000, even more preferably in the range from 10 to 500, especially preferably in the range from 15 to 100 and even more preferably in the range from 20 to 50.

Polymers having a high mean degree of polymerization Pn have good mechanical and/or processing properties.

b1) Mean Molecular Weight

The polymers of the invention have a mean molecular weight of ≥203 g/mol. This can be calculated from the polymerization level of 4 or more and the smallest preferred monomer mixture used (3×ethylenediamine (60.1 g/mol) and 1×1,3-propanediamine=74.1 g/mol) as follows: polymerization level=molecular weight of the polymer/(average molecular weight of the repeat unit−molecular weight of the ammonia leaving group)=(203 g/mol/(50.8 g/mol−3×17.03 g/mol)). The average molecular weight of the repeat unit can be calculated as follows: average molecular weight of the repeat unit=(3×60.1 g/mol+74.1 g/mol)/4=50.8 g/mol.

Preference is given to a mean molecular weight in the range from 100 to 1 000 000 g/mol, more preferably in the range from 200 to 100 000 g/mol, most preferably in the range from 245 to 10 000 g/mol.

c) Polydispersity

The polydispersity (Pw/Pn) of the polymers is generally in the range from 1.2 to 20, preferably of 1.5-7.5, where Pn is the numerical average of the degree of polymerization and Pw the weight average of the degree of polymerization.

Preferably, the polydispersity (Pw/Pn) of the polymers is in the range from 1.2 to 5, more preferably in the range from 1.3 to 4 and most preferably in the range from 1.5 to 5.

Such polymers have a good profile of properties and have good processibility.

d) Metal Content

The polymers preferably have a low metal content.

The metal content is preferably less than 500 ppm, more preferably less than 100 ppm, even more preferably less than 10 ppm and especially preferably less than 1 ppm. Such polymers have low reactivity. Low reactivity means that the reaction rate of the polymers in further reactions, for example the reaction with diisocyanates to give polyureas, is low. In addition, polymers having a low metal content have elevated stability with respect to environmental influences, such as light, ultraviolet radiation, temperature or moisture.

e) Phosphorus Content

The polymers preferably have a low phosphorus content.

The phosphorus content is preferably less than 500 ppm, more preferably less than 100 ppm, even more preferably less than 10 ppm and especially preferably less than 1 ppm.

Polymers having a low phosphorus content generally have elevated stability with respect to environmental influences, such as light, ultraviolet radiation, temperature or moisture.

f) Color Number

The polymers additionally preferably have a low color number.

The color number is preferably less than 200 Hazen, more preferably less than 150 Hazen, even more preferably less than 100 Hazen and yet more preferably less than 80 Hazen.

The Hazen color number is preferably in the range from 0 to 200, more preferably in the range from 5 to 150, even more preferably in the range from 10 to 100 and especially preferably in the range from 20 to 60.

The Hazen color number is generally measured to ASTM D1209 or DIN 53409.

A low color number enables the use of the polymers in sectors where color is regarded as a quality feature. These are most industrial applications, especially applications in coatings, paints or adhesives.

g) OH Number

In contrast to polyamines which are prepared by homogeneously catalyzed conversion of diamines and diols or by conversion of amino alcohols, the polymers preferably have a low OH number and a low degree of branching. A low OH number has the advantage that the polymers have a relatively high charge density and a relatively low water solubility.

A relatively high charge density may advantageous in the use of the polymers as such or as a synthesis unit for a) an adhesion promoter, for example for printing inks for laminate films;

b) an assistant (adhesion), for example for production of multilayer composite films, with compatibilization not just of different polymer layers but also of metal foils;

c) an adhesion promoter for adhesives, for example in conjunction with polyvinyl alcohol, butyrate and acetate and styrene copolymers, or as a cohesion promoter for label adhesives;

d) a primer in coatings applications for improvement of adhesion on substrates such as glass, wood, plastic and metal;

e) a substance for improvement of wet adhesion, for example in standard emulsion paints, and for improvement of instantaneous rain resistance of paints, for example for road markings;

f) a complexing agent, especially with high binding capacity for heavy metals such as Hg, Pb, Cu, Ni;

g) a flocculant, for example in water treatment/water processing;

h) a penetration aid, for example for active metal salt formulations in wood protection;

i) a corrosion inhibitor, for example for iron and nonferrous metals and in the sectors of petroleum production and of secondary oil production;

j) a substance for immobilization of proteins and enzymes; microorganisms or as immobilizing the supports of enzymes and microorganisms;

k) a substance for blocking and sealing, for example mineral oil and natural gas industry;

l) a fixative, for example in the textile industry, especially as formaldehyde-free co-fixer;

m) an additive in the cosmetics sector, for example for hair-setting compositions and hair rinses;

n) an auxiliary in the papermaking industry, for example for acceleration of dewatering, elimination of contraries, neutralization of charge and paper coating;

o) a substance for separation of oil and water, for example in the metalworking industry;

p) an additive for landfill seals;

q) a flocculant;

r) a swimming bath algicide;

s) a substance for production of bitumen chemicals by reaction with fatty acids;

t) an antiswelling agent in order that clay absorbs water in a retarded manner;

u) an emulsifier or emulsion breaker;

v) a surfactant in the industrial cleaning (IC) and homecare, textile care and personal care sector;

w) a wood protector;

x) a substance for preparation of complexing agents (polycarboxylates);

y) a substance for production of auxiliaries for ore mining and mineral processing;

z) a dispersant for pigments, ceramic, carbon black, carbon, carbon fibers, metal powders;

aa) a substance for gas scrubbing as an absorbent of $CO_2$, $NO_x$, $SO_x$, $Cl_2$ and aldehydes and for neutralization of acidic constituents;

ab) a substance for water softening;

ac) a crystallization inhibitor;

ad) a rheology modifier (thickener);

ae) an auxiliary for the production and processing of oil, coal and natural gas;

af) a substance for production of synthetic rubber and rubber chemicals;

ag) an additive in coolants, lubricants and cooling lubricants;

ah) an auxiliary in the construction chemicals sector;

ai) a constituent of galvanizing baths;

aj) a substance for production of nonviral gene vectors;

ak) an epoxy hardener;

al) a formulating agent for plant protection compositions;

am) a crosslinker for conformance control and for selective water shut-off measures in the oil and gas production sector;

an) a biocide for prevention and treatment of biofilms;

ao) a substance for production of flame retardants;

ap) a starter for polyols, as a crosslinker and scavenger of aldehydes in the polyurethanes sector or aq) a substance for preparation of polyureas.

The OH number is preferably less than 5 mg KOH/g, more preferably less than 2 mg KOH/g, even more preferably less than 1 mg KOH/g and especially preferably less than 0.5 mg KOH/g.

The determination of the OH number can be effected to DIN 53240.

h) Chloride Content

The polymers preferably have a low chloride content.

The chloride content is preferably less than 500 ppm, more preferably less than 100 ppm, even more preferably less than 10 ppm and especially preferably less than 1 ppm.

Polymers having a low chloride content are generally relatively noncorrosive and can find uses in the corrosion protection sector.

i) Proportion of Deaminated Products

The polymers preferably have a low degree of deamination.

The proportion of deaminated polymers is preferably less than 3% by weight, more preferably less than 2% by weight and especially preferably less than 1% by weight.

In a preferred embodiment, the polymers after preparation and before formulation have at least one, or any combination of at least two, of the following properties:
a) a degree of branching of 0 to 0.5, preferably 0.01 to 0.3; and/or
b) a mean degree of polymerization Pn of 5 or more, preferably in the range from 10 to 500; and/or
c) a polydispersity in the range from 1.2 to 5, preferably 1.5 to 5; and/or
d) a metal content of less than 10 ppm, preferably less than 1 ppm; and/or
e) a phosphorus content of less than 10 ppm, preferably less than 1 ppm; and/or
f) a color number of less than 80 Hazen, preferably in the range from 20 to 60 Hazen; and/or
g) an OH number of less than 5 mg KOH/g, preferably less than 2 mg KOH/g,
h) and chloride content of less than 500 ppm
i) a proportion of deaminated polymers of less than 3% by weight.

In a very particularly preferred embodiment, the abovementioned polymers have all the aforementioned properties a), b), c), d), e), f), and g).

In a very particularly preferred embodiment, the abovementioned polymers have all the aforementioned properties a), b), c), d), e), f), g), and h).

In a very particularly preferred embodiment, the abovementioned polymers have all the aforementioned properties a), b), c), d), e), f), g), h) and i).

The abovementioned polymers are preferentially suitable for the following applications, as such or as a synthesis unit for
a) an adhesion promoter, for example for printing inks for laminate films;
b) an assistant (adhesion), for example for production of multilayer composite films, with compatibilization not just of different polymer layers but also of metal foils;
c) an adhesion promoter for adhesives, for example in conjunction with polyvinyl alcohol, butyrate and acetate and styrene copolymers, or as a cohesion promoter for label adhesives;
d) a primer in coatings applications for improvement of adhesion on substrates such as glass, wood, plastic and metal;
e) a substance for improvement of wet adhesion, for example in standard emulsion paints, and for improvement of instantaneous rain resistance of paints, for example for road markings;
f) a complexing agent, especially with high binding capacity for heavy metals such as Hg, Pb, Cu, Ni;
g) a flocculant, for example in water treatment/water processing;
h) a penetration aid, for example for active metal salt formulations in wood protection;
i) a corrosion inhibitor, for example for iron and nonferrous metals and in the sectors of petroleum production and of secondary oil production;
j) a substance for immobilization of proteins and enzymes; microorganisms or as immobilizing the supports of enzymes and microorganisms;
k) a substance for blocking and sealing, for example mineral oil and natural gas industry;
l) a fixative, for example in the textile industry, especially as formaldehyde-free co-fixer;
m) an additive in the cosmetics sector, for example for hair-setting compositions and hair rinses;
n) an auxiliary in the papermaking industry, for example for acceleration of dewatering, elimination of contraries, neutralization of charge and paper coating;
o) a substance for separation of oil and water, for example in the metalworking industry;
p) an additive for landfill seals;
q) a flocculant;
r) a swimming bath algicide;
s) a substance for production of bitumen chemicals by reaction with fatty acids;
t) an antiswelling agent in order that clay absorbs water in a retarded manner;
u) an emulsifier or emulsion breaker;
v) a surfactant in the industrial cleaning (IC) and homecare, textile care and personal care sector;
w) a wood protector;
x) a substance for preparation of complexing agents (polycarboxylates);
y) a substance for production of auxiliaries for ore mining and mineral processing;
z) a dispersant for pigments, ceramic, carbon black, carbon, carbon fibers, metal powders;
aa) a substance for gas scrubbing as an absorbent of $CO_2$, $NO_x$, $SO_x$, $Cl_2$ and aldehydes and for neutralization of acidic constituents;
ab) a substance for water softening;
ac) a crystallization inhibitor;
ad) a rheology modifier (thickener);
ae) an auxiliary for the production and processing of oil, coal and natural gas;
af) a substance for production of synthetic rubber and rubber chemicals;
ag) an additive in coolants, lubricants and cooling lubricants;
ah) an auxiliary in the construction chemicals sector;
ai) a constituent of galvanizing baths;
aj) a substance for production of nonviral gene vectors;
ak) an epoxy hardener;
al) a formulating agent for plant protection compositions;
am) a crosslinker for conformance control and for selective water shut-off measures in the oil and gas production sector;
an) a biocide for prevention and treatment of biofilms;
ao) a substance for production of flame retardants;
ap) a starter for polyols, as a crosslinker and scavenger of aldehydes in the polyurethanes sector or
aq) a substance for preparation of polyureas.

The present invention enables
the use of a multitude of monomers, such that a great multitude of homo- and copolymers can be achieved (through the choice of monomers, the properties of the polymers prepared can be tailored),
the use of monomers which are available commercially and/or inexpensively and/or can be handled without a high level of safety measures, or which are advantageous in terms of their toxicological properties, the preparation of polyamines from bifunctional monomers which are essentially linear and have a low level of branching, the preparation of polyamines having a low metal content, the preparation of polyamines having a low phosphorus content, the preparation of polyamines which are essentially colorless or have only a low discoloration level, the preparation of polyamines having a high mean degree of polymerization, the preparation of polyamines having a low OH number combined with a high charge density, the preparation of polyamines with a low degree of deamination, the preparation of polyamines having a low chloride content, the preparation of polyamines having both a low degree of branching and a high mean degree of polymerization, and/or the preparation of polyamines having a narrow defined mean molecular weight, possibly the preparation of polyamines having a low proportion of low boilers.

In addition, the process according to the invention may have the following advantages:

comparatively short residence times or reaction times, the catalyst used for polymerization can be separated in a simple manner from polymer and be used further for further polymerizations, long service life and activity of the catalyst in the process, such that the frequency of complex catalyst exchanges can be reduced, a high degree of polymerization or a high conversion of diamines can be achieved with short residence times, the recycling of unconverted diamine can be enabled, and/or the process can be operated continuously.

WORKING EXAMPLES

Comparative Example 1

Polymerization of 1,3-Propanediamine (1,3-PDA) to Polypropylenepolyamine: Dependence of the Mean Molecular Weight (Mw) on the Partial Hydrogen Pressure and the Polymerization Temperature The polymerization was conducted in a 1 L reactor (length 1.5 m, diameter 3 cm) which consisted of 1.4514 (stainless steel). The reactor was charged with 0.6 liter of an unsupported cobalt catalyst prepared according to EP-A-0636409 (example, catalyst A). In liquid phase mode, 0.42 kg of 1,3-propanediamine and 60 L (STP) of hydrogen per hour were passed over the catalyst at 162° C. and total hydrogen pressure 50 bar. The catalyst hourly space velocity was 0.65 kg per liter of catalyst and hour. The reaction output was condensed. 1,3-Propanediamine, dimers and trimers were separated out of the polymer mixture by distillation on an evaporator at 175° C. and 0.005 bar. The mean molecular weight of the polymer mixture was 509 g/mol.

Example 2 (Comparative)

The procedure is as in comparative example 1, except that the temperature is 163° C. The mean molecular weight of the polymer mixture attained as a result was 690 g/mol.

Example 3 (Comparative)

The procedure is as in comparative example 1, except that the temperature is 164° C. The mean molecular weight of the polymer mixture attained as a result was 795 g/mol.

Example 4 (Inventive)

The procedure is as in comparative example 1, except that the pressure is 75 bar and the temperature is 164° C. The catalyst hourly space velocity was 0.7 kg per liter of catalyst and hour. The mean molecular weight of the polymer mixture attained as a result was 361 g/mol.

Example 5 (Inventive)

The procedure is as in comparative example 1, except that the pressure is 75 bar and the temperature is 165° C. The catalyst hourly space velocity was 0.7 kg per liter of catalyst and hour. The mean molecular weight of the polymer mixture attained as a result was 444 g/mol.

Example 6 (Inventive)

The procedure is as in comparative example 1, except that the pressure is 75 bar and the temperature is 166° C. The catalyst hourly space velocity was 0.7 kg per liter of catalyst and hour. The mean molecular weight of the polymer mixture attained as a result was 467 g/mol.

Example 7 (Inventive)

The procedure is as in comparative example 1, except that the pressure is 100 bar and the temperature is 161° C. The catalyst hourly space velocity was 0.7 kg per liter of catalyst and hour. The mean molecular weight of the polymer mixture attained as a result was 310 g/mol.

Example 8 (Inventive)

The procedure is as in comparative example 1, except that the pressure is 100 bar and the temperature is 162° C. The catalyst hourly space velocity was 0.7 kg per liter of catalyst and hour. The mean molecular weight of the polymer mixture attained as a result was 315 g/mol.

Example 9 (Inventive)

The procedure is as in comparative example 1, except that the pressure is 100 bar and the temperature is 163° C. The catalyst hourly space velocity was 0.7 kg per liter of catalyst and hour. The mean molecular weight of the polymer mixture attained as a result was 320 g/mol.

Example 10 (Inventive)

The procedure is as in comparative example 1, except that the pressure is 100 bar and the temperature is 164° C. The catalyst hourly space velocity was 0.7 kg per liter of catalyst and hour. The mean molecular weight of the polymer mixture attained as a result was 323 g/mol.

In further polymerization experiments, it was found that even a deviation in the polymerization temperature by 1° C. leads to a change in the mean molecular weight by 140 g/mol. With increasing total hydrogen pressure, however, the variations in the mean molecular weight declined: In the case of a 1° C. deviation and 75 bar of hydrogen, the deviation is 53 g/mol, and only 5 g/mol at 100 bar (FIG. 1).

By increasing the hydrogen pressure, it is possible to compensate for the influence of deviations in the reaction temperature on the mean molar mass.

The positive influence of higher hydrogen pressures was not apparent from example 1 in DE-A 26 05 212, which was conducted at a hydrogen pressure of 50 bar (analogously to a parameter of inventive example 1).

Example 11 (Inventive)

PPI Distillation

The distillative workup of the raw material based on 1,3-diaminopropane was conducted in an apparatus having a thin film evaporator, with the aim of lowering the proportion by mass of the trimer below 0.1%. To this end, liquid raw material was applied from above to the vertical glass evaporator surface (0.016 m$^2$) of the thin film evaporator, while nitrogen flowed through the apparatus from the bottom upward in countercurrent. A liquid film was formed on the inner wall of the evaporator surface with the aid of a stirrer system having mobile stirrer blades. The necessary energy input for partial evaporation of the crude stream supplied was introduced into the liquid film from outside by means of an outer jacket space through which hot oil flowed. The gas phase which forms under the prevailing conditions was fed to series-connected coolers with decreasing coolant temperature, in order to liquefy condensable constituents. The low boiler streams obtained in this way, consisting predominantly of monomer, dimer, trimer and tetramer, can be recycled into the reaction section as a reactant constituent. Thus, the low boiler stream of the distillation does not constitute any loss of yield within the overall process. The unevaporable liquid constituents are collected at the lower end of the thin film evaporator as the product of value.

| Composition | Raw material |
| --- | --- |
| Monomer | 20% |
| Dimer | 15% |
| Trimer | 13% |
| Tetramer | 10% |
| Pentamer | 3% |
| Higher | 39% |

| Pressure [mbar] | Oil T [° C.] | m of raw material [g/h] | vol. of N$_2$ [L (STP)/h] | m of product of value [g/h] | w(trimer) [ppm by wt.] |
| --- | --- | --- | --- | --- | --- |
| 15 | 215 | 36 | 10 | 14.8 | 552 |
| 15 | 215 | 36 | 5 | 16.0 | 871 |

The invention claimed is:

1. A process for preparing a polyamine, the process comprising polycondensing at least one diamine in liquid phase in the presence of hydrogen and at least one catalyst based on at least one metal of transition groups 8 to 11 of the Periodic Table of the Elements, by keeping pressure constant during the polycondensing through continuous supply of an inert gas, hydrogen, or both, and removing the inert gas, the hydrogen, or both, and ammonia formed during the polycondensing, wherein:
the polycondensing occurs at a temperature of 150 to 180° C. and a pressure of 60 to 150 bar; and
a mean molecular weight of the polyamine is ≥203 g/mol, in which a deviation from the mean molecular weight per ° C. of change in reaction temperature is <19% of the mean molecular weight.

2. The process according to claim 1, wherein the polyamine has a low boiler content of <5%.

3. The process according to either of claim 1, wherein the polycondensing occurs at 75 to 200 bar.

4. The process according to claim 1, wherein exclusively hydrogen is continuously supplied during the polycondensing.

5. The process according to claim 1, wherein the at least one diamine is selected from the group consisting of ethylenediamine 1,3-propylenediamine, 1,2-propylenediamine, 1,4-butylenediamine, 1,2-butylenediamine, 1,5-diaminopentane, 1,2-diaminopentane, 1,5-diamino-2-methylpentane, 1,6-diaminohexane, 1,2-diaminohexane, 1,7-diaminoheptane, 1,2-diaminoheptane, 1,8-diaminooctane, 1,2-diaminooctane, 1,9-nonamethylenediamine 1 10-decamethylenediamine, 1,2-diaminodecane, 1,11-undecamethylenediamine, 1,2-diaminoundecane, 1,12-dodecamethylenediamine, 1,2-diaminododecane, 2,2-dimethylenepropane, 1,3-diamine, 4,7,10-trioxatridecane-1,3-diamine, 4,9-dioxydedecane-1,12-diamine, 3-(methylamino)propylamine and mixtures thereof.

6. The process according to claim 1, wherein:
the pressure is in the range from 75 to 100 bar; and
the diamine is 1,3-propanediamine.

7. The process according to claim 1, wherein the at least one catalyst is obtained from at least one catalyst precursor comprising one or more oxide of elements Cu, Co, Ni, or a mixture thereof.

* * * * *